(12) United States Patent
Ahn et al.

(10) Patent No.: US 11,971,517 B1
(45) Date of Patent: Apr. 30, 2024

(54) MOBILE APPARATUS FOR OBSERVING PRECIPITATION AND METHOD FOR CONTROLLING THE SAME

(71) Applicant: NATIONAL INSTITUTE OF METEOROLOGICAL SCIENCES, Seogwipo-si (KR)

(72) Inventors: Bo Yeong Ahn, Gangneung-si (KR); Yoo Jun Kim, Gangneung-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 18/405,178

(22) Filed: Jan. 5, 2024

(30) Foreign Application Priority Data

Jan. 5, 2023 (KR) .......................... 10-2023-0001658

(51) Int. Cl.
*G01W 1/14* (2006.01)
(52) U.S. Cl.
CPC ..................................... *G01W 1/14* (2013.01)
(58) Field of Classification Search
None
See application file for complete search history.

(56) References Cited

U.S. PATENT DOCUMENTS

| | | | |
|---|---|---|---|
| 2023/0112192 A1* | 4/2023 | Kim | G01F 23/2921 73/170.17 |
| 2023/0116186 A1* | 4/2023 | Kim | G01B 3/04 73/170.17 |

FOREIGN PATENT DOCUMENTS

| | | |
|---|---|---|
| KR | 10-1230558 B1 | 2/2013 |
| KR | 10-2021-0066283 A | 6/2021 |
| KR | 10-2021-0089090 A | 7/2021 |
| KR | 10-2465078 B1 | 11/2022 |

* cited by examiner

*Primary Examiner* — Peter J Macchiarolo
*Assistant Examiner* — Jermaine L Jenkins
(74) *Attorney, Agent, or Firm* — Bridgeway IP Law Group, PLLC; Jihun Kim

(57) ABSTRACT

Described is a mobile apparatus for observing precipitation, the mobile apparatus including a bottom plate including a plurality of precipitation gauges and a movable member, a movement unit configured to move a position of the bottom plate from a first position to a second position by using the movable member, an observation time determination unit configured to determine a precipitation observation time on the basis of seasonal information, and a control unit configured to control the plurality of precipitation gauges on the basis of the precipitation observation time when precipitation is detected.

14 Claims, 12 Drawing Sheets

MOBILE APPARATUS FOR OBSERVING PRECIPITATION AND METHOD FOR CONTROLLING THE SAME

CROSS-REFERENCE TO RELATED APPLICATIONS

This application claims the priority of Korean Patent Application No. 10-2023-0001658 filed on Jan. 5, 2023, in the Korean Intellectual Property Office, the disclosure of which is incorporated herein by reference.

BACKGROUND

Field

The present application relates to a mobile apparatus for observing precipitation and a method for controlling the same.

Description of the Related Art

Precipitation gauges, which measure the precipitation amount to be used for weather observation and operation and management of dams and rivers, are sensing technologies required to ensure self-reliant technologies for severe weather observation and disaster prevention technologies such as water disaster prediction, localized precipitation, and hazardous weather monitoring. The precipitation gauges are used by the Meteorological Administration, the rural development administration, the Forest Service, the Ministry of Land, Infrastructure, and Transport, and local governments to measure the precipitation amount, and the measured precipitation is used for rural and fishing communities, forest greening, and safety management. The precipitation gauges are used to record and manage precipitation to predict and utilize the precipitation amount for the following year, and the precipitation gauges are used in a wide range of fields. Accurate measurement of precipitation amount is necessary for disaster and catastrophe preparedness and for economic benefits in the event of flooding.

However, measurement instruments, such as auto-emptying type weighing precipitation gauges, which are currently operated at ordinary times by weather observation stations, cannot quickly cope with situational problems such as sudden snowfall events at the time of measuring pure rainfall. For this reason, the quality of precipitation observation data deteriorates because of errors of precipitation amount observation data and observation errors caused by fallen leaves or pine needles accumulated in drainage facilities.

The background art of the present application is disclosed in Korean Patent No. 10-1230558.

SUMMARY

The present disclosure has been made in an effort to solve the above-mentioned problem in the related art, and an object of the present disclosure is to provide a mobile apparatus for observing precipitation and a method for controlling the same, which are capable of preventing a problem in that a precipitation gauge cannot quickly cope with situational problems of sudden snowfall events when the precipitation gauge measures pure rainfall, and precipitation amount observation data contain errors.

The present disclosure has also been made in an effort to solve the above-mentioned problem in the related art, and an object of the present disclosure is to provide a mobile apparatus for observing precipitation and a method for controlling the same, which are capable of preventing an observation error caused by fallen leaves or pine needles accumulated in drainage facilities at the time of measuring the precipitation amount.

However, technical problems to be solved by the exemplary embodiment of the present application are not limited to the aforementioned technical problem, and other technical problems may be present.

According to an aspect of the present disclosure, there is provided a mobile apparatus for observing precipitation, the mobile apparatus including: a bottom plate including a plurality of precipitation gauges and a movable member; a movement unit configured to move a position of the bottom plate from a first position to a second position by using the movable member; an observation time determination unit configured to determine a precipitation observation time on the basis of seasonal information; and a control unit configured to control the plurality of precipitation gauges on the basis of the precipitation observation time when precipitation is detected.

According to the embodiment of the present application, the observation time determination unit may determine a preset first time as the precipitation observation time when the seasonal information indicates summer, and determine a preset second time as the precipitation observation time when the seasonal information indicates winter.

According to the embodiment of the present application, the observation time determination unit may decrease the precipitation observation time by a preset degree when the precipitation amount per unit time is equal to or higher than a preset degree.

According to the embodiment of the present application, the control unit may end rainfall observation when snowfall is detected during the rainfall observation.

According to the embodiment of the present application, the control unit may end the rainfall observation when a wet-bulb temperature is lower than a preset threshold wet-bulb temperature.

According to the embodiment of the present application, the control unit may start the rainfall observation when the wet-bulb temperature is equal to or higher than the threshold wet-bulb temperature.

According to the embodiment of the present application, the control unit may end the rainfall observation when a water equivalent ratio is equal to or higher than a preset degree.

According to the embodiment of the present application, the control unit may end the rainfall observation when snow density is lower than a preset degree.

According to the embodiment of the present application, the plurality of precipitation gauges may each include a lid and a drain port that are opened or closed by being controlled, the lid may be provided on an upper portion of the precipitation gauge, the drain port may be provided on a lower portion of the precipitation gauge, and the control unit may open the lid for the precipitation observation time and close the lid when the precipitation observation time has elapsed.

According to the embodiment of the present application, the control unit may close a lid of a first precipitation gauge and open a lid of a second precipitation gauge when a water level in the first precipitation gauge exceeds a preset threshold water level before the precipitation observation time ends.

According to the embodiment of the present application, when the lid of the precipitation gauge is closed or observation ends, the control unit may drain water by opening the drain port after sensing the water in the precipitation gauge.

According to the embodiment of the present application, when foreign substances are detected in the precipitation gauge with the opened lid, the control unit may discharge the foreign substances to the outside by controlling an air blower provided in the precipitation gauge.

According to the embodiment of the present application, when a temperature in the precipitation gauge is lower than a preset threshold temperature, the control unit may increase the temperature in the precipitation gauge to a temperature equal to or higher than the threshold temperature by controlling a heater provided in the precipitation gauge.

According to another aspect of the present disclosure, there is provided a method of controlling a mobile apparatus for observing precipitation, which includes a bottom plate including a plurality of precipitation gauges and a movable member, the method including: moving, by the movable member, a position of the bottom plate from a first position to a second position; determining a precipitation observation time on the basis of seasonal information; and controlling the plurality of precipitation gauges on the basis of the precipitation observation time when precipitation is detected.

The technical solution is just illustrative but should not be interpreted as being intended to limit the present application. In addition to the above-mentioned exemplary embodiment, additional exemplary embodiments may be present in the drawings and the detailed description of the present disclosure.

According to the above-mentioned technical solution of the present application, the mobile apparatus for observing precipitation and the method for controlling the same may be provided to preventing problem in that the precipitation gauge cannot quickly cope with situational problems of sudden snowfall events when the precipitation gauge measures pure rainfall, and precipitation amount observation data contain errors.

According to the above-mentioned technical solution of the present application, the mobile apparatus for observing precipitation and the method for controlling the same may be provided to prevent an observation error caused by fallen leaves or pine needles accumulated in drainage facilities at the time of measuring the precipitation amount.

However, the effects, which can be obtained by the present application, are not limited to the above-mentioned effects, and other effects may be present.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
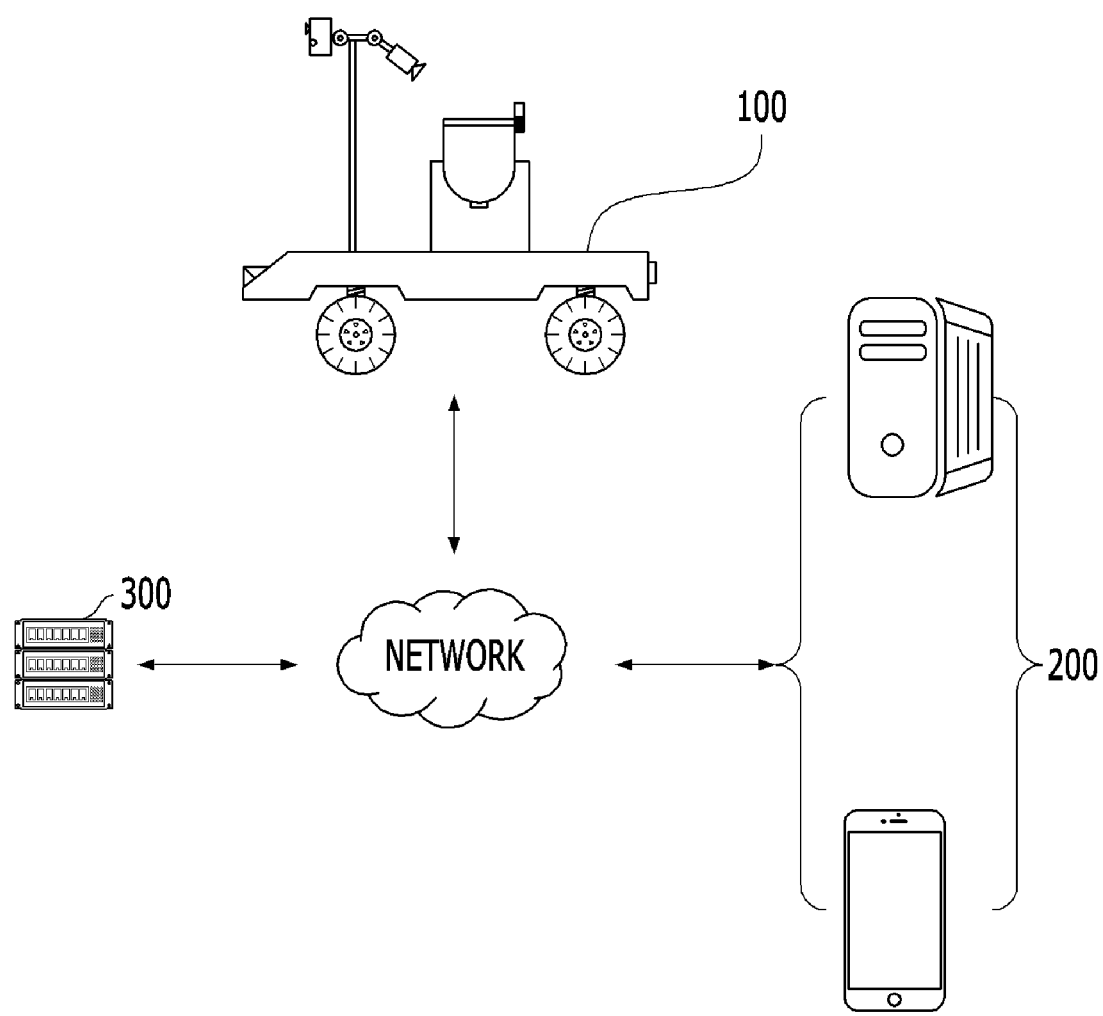
FIG. 1 a schematic configuration view of a mobile precipitation observation system according to an embodiment of the present application.

Hereinafter, embodiments of the present application will be described in detail with reference to the accompanying drawings so that those with ordinary skill in the art to which the present application pertains may easily carry out the embodiments. However, the present application may be implemented in various different ways, and is not limited to the embodiments described herein. A part irrelevant to the description will be omitted in the drawings in order to clearly describe the present application, and similar constituent elements will be designated by similar reference numerals throughout the specification.

Throughout the specification of the present application, when one constituent element is referred to as being "connected to" another constituent element, one constituent element can be "directly connected to" the other constituent element, and one constituent element can also be "electrically connected to" or "indirectly connected to" the other element with other elements therebetween.

Throughout the specification of the present application, when one member is disposed "on", "at an upper side of", "at an upper end of", "below", "at a lower side of", or "at a lower end of" another member in the present specification of the present application, this includes not only a case where one member is brought into contact with another member, but also a case where still another member is present between the two members.

Throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

FIG. 1 a schematic configuration view of a mobile precipitation observation system according to an embodiment of the present application.

With reference to FIG. 1, a mobile precipitation observation system 1 (hereinafter, also referred to as 'the present system 1') includes a mobile apparatus 100 for observing precipitation (hereinafter, also referred to as 'the present apparatus 100'), a user terminal 200, and an external server 300. However, the present application is not limited thereto.

The present apparatus 100 may move to an observation location and determine a precipitation observation time on the basis of seasonal information. When the present apparatus 100 detects precipitation, the present apparatus 100 may measure the precipitation amount on the basis of the determined precipitation observation time and transmit the measured precipitation amount to at least one of the user terminal 200 and the external server 300 through a network. The precipitation amount may include at least one of a rainfall amount and a deposited snow amount.

In addition, the present apparatus 100 may control at least one of a precipitation gauge 111 and a deposited snow observation device to determine a state of precipitation and measure the precipitation on the basis of the state of precipitation and calculate at least one of the rainfall amount, the deposited snow amount, and the precipitation amount on the basis of the measured precipitation.

The user terminal 200 may control the present apparatus 100 through the network. The user terminal 200 may be provided as a plurality of user terminals 200.

The external server 300 may store precipitation amount information, seasonal information, and information, which is a criterion for determining the seasonal information, and transmit or receive the stored information to or from at least one of the present apparatus 100 and the user terminal 200. The precipitation amount information may include at least one of rainfall amount information and deposited snow amount information. In addition, the external server 300 may store precipitation occurrence information, rainfall amount information, deposited snow amount information, precipitation amount information, and the like and transmit or receive the stored information to or from at least one of the present apparatus 100 and the user terminal 200.

According to the embodiment of the present application, the present apparatus 100 may provide the user terminal 200 with a rainfall amount measurement menu, a deposited snow amount measurement menu, and a precipitation amount measurement menu. For example, the user terminal 200 may download and install an application program, which is provided by the present apparatus 100, and provide the rainfall amount measurement menu, the deposited snow amount measurement menu, and the precipitation amount measurement menu through the installed application.

The present apparatus 100 and the external server 300 may include all types of servers, terminals, or devices that transmit or receive data, contents, and various types of communication signals to or from the user terminal 200 through networks and have functions of storing and processing data.

The user terminal 200 may be a device that operates in conjunction with the present apparatus 100 and the external server 300 through the network. For example, the user terminal 200 may be all types of wireless communication devices such as a smartphone, a smart pad, a tablet PC, a wearable device, a personal communication system (PCS), a global system for mobile communication (GSM), a personal digital cellular (PDC), a personal handy phone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, and a stationary terminal such as a desktop computer and a smart TV.

Examples of the network for sharing information between the present apparatus 100 and the user terminal 200 may include, but not limited to, the 3rd generation partnership project (3GPP) network, the long-term evolution (LTE) network, the 5G network, the world interoperability for microwave access (WIMAX) network, the wired or wireless Internet, the local area network (LAN), the wireless local area network (Wireless LAN), the wide area network (WAN), the personal area network (PAN), the Bluetooth network, the Wi-Fi network, the near field communication (NFC) network, the satellite broadcast network, the analog broadcast network, the digital multimedia broadcasting (DMB) network, or the like.

Figure 2:
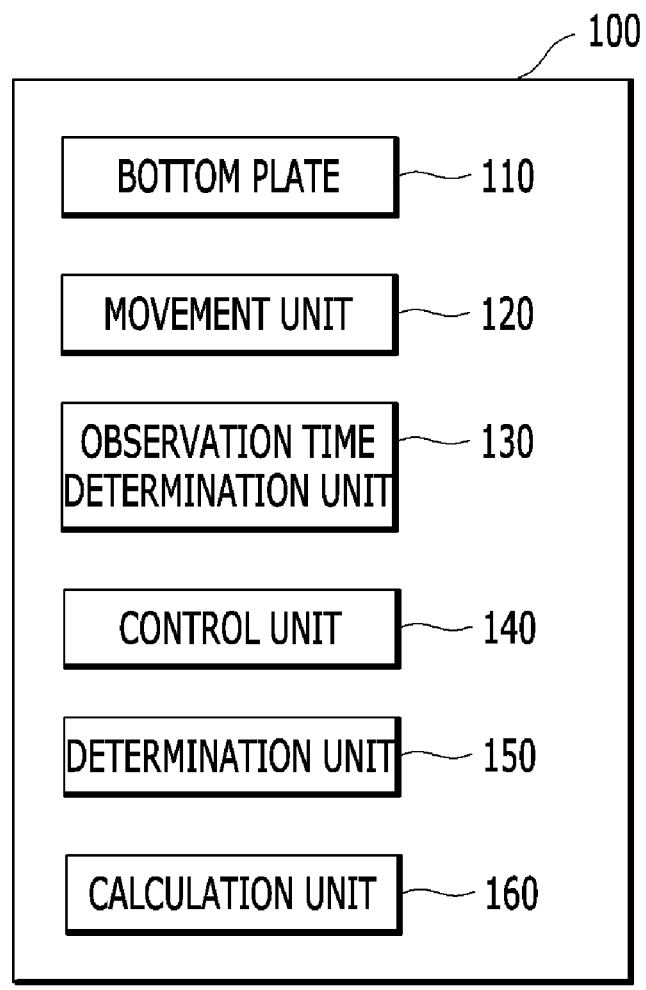
FIG. 2 is a schematic block diagram of a mobile apparatus for observing precipitation according to the embodiment of the present application.

FIG. 2 is a schematic block diagram of the mobile apparatus 100 for observing precipitation according to the embodiment of the present application.

With reference to FIG. 2, the present apparatus 100 may include a bottom plate 110, a movement unit 120, an observation time determination unit 130, a control unit 140, a determination unit 150, and a calculation unit 160.

Figure 3:
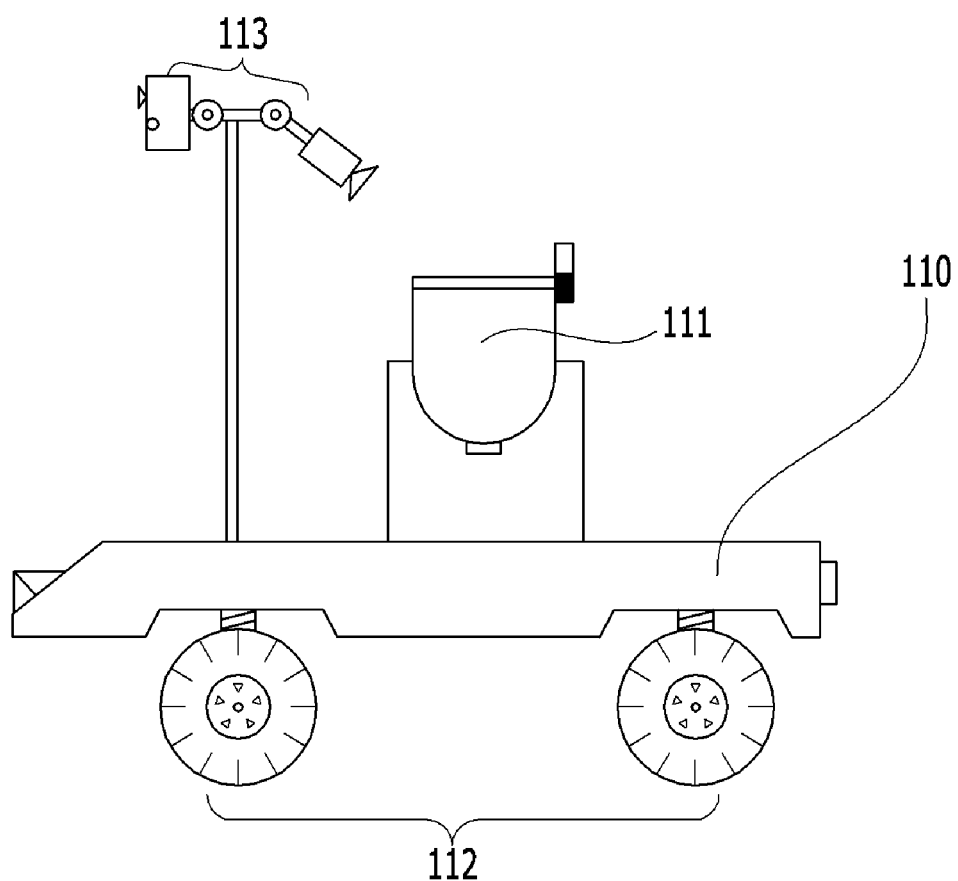
FIG. 3 is a left side view of the mobile apparatus for observing precipitation according to the embodiment of the present application.

FIG. 3 is a left side view of the mobile apparatus 100 for observing precipitation according to the embodiment of the present application.

Figure 4:
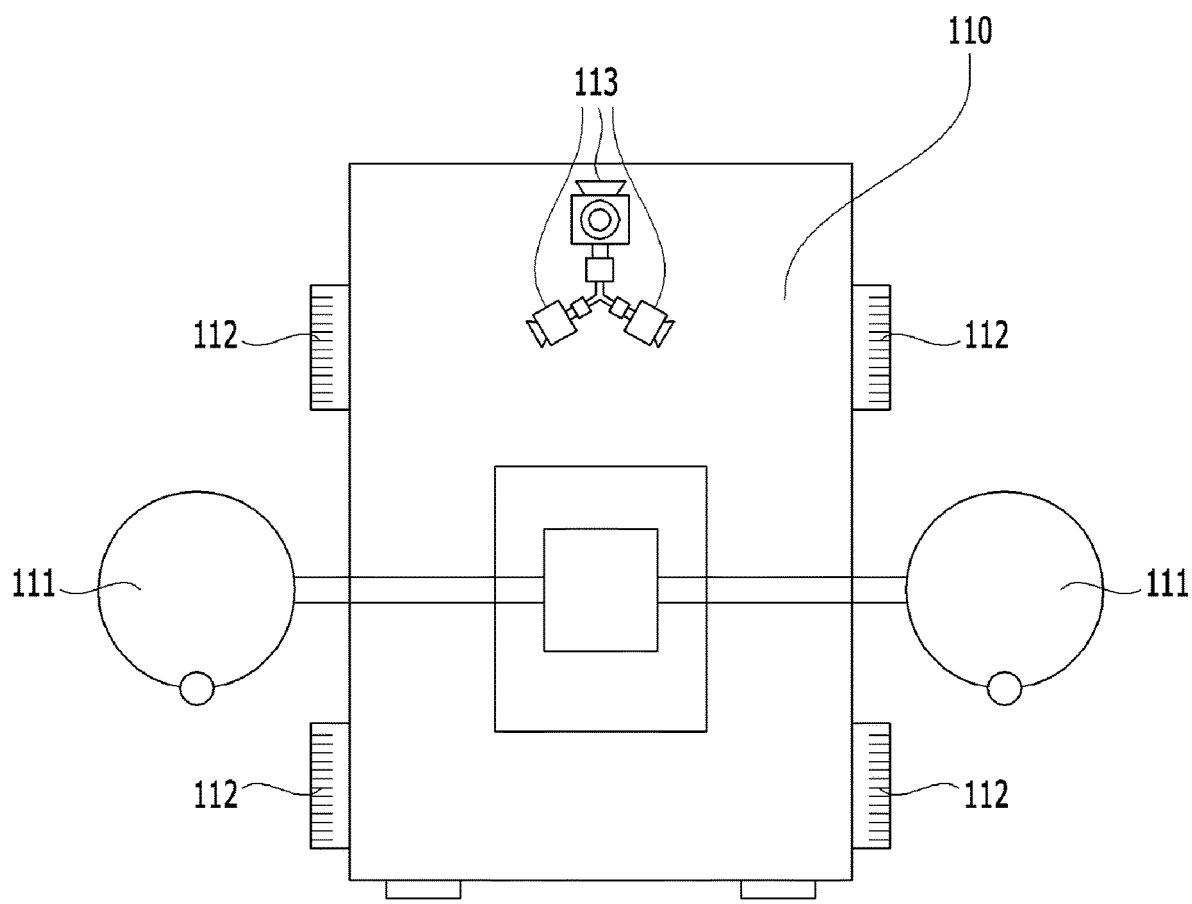
FIG. 4 is a top plan view of the mobile apparatus for observing precipitation according to the embodiment of the present application.

FIG. 4 is a top plan view of the mobile apparatus 100 for observing precipitation according to the embodiment of the present application.

With reference to FIGS. 3 and 4, the present apparatus 100 includes the precipitation gauges 111, movable members 112, and camera sensors 113. However, the present application is not limited thereto. The present apparatus 100 may have a plurality of sensors.

The precipitation gauges 111 may include a rain gauge. The precipitation gauges 111 may include a general precipitation gauge in the related art, a conductive precipitation gauge, a gravimetric precipitation gauge, a surface tension precipitation gauge, a siphon precipitation gauge, a radar precipitation gauge, a piezoelectric precipitation gauge, an optical precipitation gauge, and the like. However, the present application is not limited thereto. The present apparatus 100 may include at least one of the precipitation gauges 111.

The movable member 112 may be provided in the form of a vehicle using a wheel operation, as illustrated in FIGS. 3 and 4, or provided in the form of a drone, a boat, or an amphibious vehicle. However, the present application is not limited thereto.

The camera sensors 113 may include the precipitation gauge 111, an image-capturing camera sensor 113, a traveling camera sensor 113, a sky-view monitoring camera sensor 113, a deposited snow observing camera sensor 113 (also referred to as a camera sensor 113 for capturing an image of a graduated ruler 114 for measuring deposited snow), and the present apparatus 100 may have at least one of the camera sensors 113.

The plurality of sensors includes a temperature sensor, a humidity sensor, a wet-bulb temperature sensor, an atmospheric pressure sensor, an airflow rate sensor, a wind direction sensor, a wind velocity sensor, and the like. However, the present application is not limited thereto.

According to the embodiment of the present application, the bottom plate 110 may have the plurality of precipitation gauges 111 and the plurality of movable members 112.

For example, the bottom plate 110 may have the plurality of even-numbered precipitation gauges 111. The precipitation gauges 111 may be provided to be symmetric with respect to the bottom plate 110. In addition, for example, at least one left precipitation gauge 111 may be provided at the left side of the bottom plate 110, and at least one right precipitation gauge 111 may be provided at the right side of the bottom plate 110. In addition, at least one front precipitation gauge 111 may be provided on a front surface of the bottom plate 110 among the precipitation gauges 111. In addition, at least one rear precipitation gauge 111 may be provided on a rear surface of the bottom plate 110 among the precipitation gauges 111. The precipitation gauge 111 may drain water. The precipitation gauge 111 may be provided at a position at which a degree to which the measurement and water draining process of the precipitation gauge 111 hinders a movement process of the movable member 112 is lower than a predetermined degree. The precipitation gauge 111 may be provided on an extension member provided on the bottom plate 110. The plurality of precipitation gauges 111 may have the same standard.

As another example, when the movable member 112 is provided in the form of a vehicle, the movable member 112 may be provided on a lower portion of the bottom plate 110. In addition, when the movable member 112 is provided in the form of a drone, the movable member 112 may be provided on an upper portion of the bottom plate 110. In addition, when the movable member 112 is provided in the form of a boat, the movable member 112 may be provided on the lower portion and a lateral portion of the bottom plate 110, a lower surface of the boat is provided on the lower portion of the bottom plate 110, and a power source using an underwater propeller may be provided on the lateral portion of the bottom plate 110.

According to the embodiment of the present application, the movement unit 120 may use the movable members 112 and move the position of the bottom plate 110 from a first position to a second position.

For example, the first and second positions may be information on positions at which the bottom plate 110 may be positioned by using the movable members 112. The second position may be information on a position to which the present apparatus 100 may move from the first position by using the movable members 112 and using an energy amount smaller than a preset threshold energy amount of energy reserves of an energy source of the present apparatus 100. For example, when the movable member 112 is a vehicle, the first and second positions may include a position located on the ground surface and located on mountainous terrain. As another example, the movable member 112 is a drone, the first and second positions may include a position located on the ground surface or a position located in the air. As another example, when the movable member 112 is a boat, the first and second positions may include a position located on the sea surface. As another example, when the movable member 112 is an amphibious vehicle, the first and second positions may include a position located on the ground surface or a position located on the sea surface.

As another example, when the movable member 112 of the present apparatus 100 cannot move to the second position, the present apparatus 100 may control another present apparatus 100, which may move to the second position, to move another present apparatus 100 to the second position.

According to the embodiment of the present application, the observation time determination unit 130 may determine a precipitation observation time on the basis of seasonal information.

For example, the observation time determination unit 130 may determine the precipitation gauge observation time on the basis of the seasonal information received from the user terminal 200 or the external server 300.

As another example, the observation time determination unit 130 may calculate the seasonal information on the basis of sensing information created by using the sensor provided in the present apparatus 100 and determine the precipitation observation time on the basis of the calculated seasonal information.

As another example, the observation time determination unit 130 may calculate the seasonal information on the basis of date information and determine the precipitation observation time on the basis of the calculated seasonal information.

As another example, the observation time determination unit 130 may calculate the seasonal information on the basis of astronomical information and determine the precipitation observation time on the basis of the calculated seasonal information.

As another example, the observation time determination unit 130 may calculate the seasonal information on the basis of image information created by the camera sensor 113 and determine the precipitation observation time on the basis of the calculated seasonal information.

As another example, the observation time determination unit 130 may calculate the seasonal information on the basis of the image information created by the camera sensor 113, the position information of the present apparatus 100, and preset seasonal indicator biomass information and determine the precipitation observation time on the basis of the calculated seasonal information.

As another example, the precipitation observation time may include at least one of a rainfall observation time and a deposited snow observation time. The observation time determination unit 130 may determine at least one of the rainfall observation time and the deposited snow observation time included in the precipitation observation time on the basis of the seasonal information.

According to the embodiment of the present application, when rainfall is detected, the control unit 140 may control the plurality of precipitation gauges 111 on the basis of the precipitation observation time.

For example, when a precipitation detection sensor 111a provided in the precipitation gauge 111 detects precipitation, the control unit 140 may control at least one of the plurality of precipitation gauges 111, the deposited snow observing camera sensor 113, and a deposited snow removing member 115 on the basis of the precipitation observation time. In addition, when the camera sensor 113 provided in the present apparatus 100 detects precipitation, the control unit 140 may control at least one of the plurality of precipitation gauges 111, the deposited snow observing camera sensor 113, and the deposited snow removing member 115 on the basis of the precipitation observation time. In addition, the control unit 140 may control the precipitation gauge 111 on the basis of the rainfall observation time included in the precipitation observation time and control at least one of the deposited snow observing camera sensor 113 and the deposited snow removing member 115 on the basis of the deposited snow observation time included in the precipitation observation time.

As another example, the control unit 140 may measure the precipitation amount by using one precipitation gauge 111 for the precipitation observation time. When the precipitation accommodated in one precipitation gauge 111 exceeds a threshold water level even though the precipitation observation time is not ended, the measurement by one precipitation gauge 111 may be stopped, and the precipitation amount may be measured by using the other precipitation gauge 111. In addition, the control unit 140 measures the deposited snow amount first for the deposited snow observation time by using the deposited snow observing camera sensor 113 and the graduated ruler 114. When the amount of deposited snow accumulated on an upper portion of the bottom plate 110 exceeds a preset threshold graduation of the graduated ruler 114 even though the deposited snow observation time is not ended, the deposited snow removing member 115 may be used to push the deposited snow from one region on the upper portion of the bottom plate 110, and the deposited snow observation time is temporarily stopped while the deposited snow removing member 115 is controlled. When it is determined that the amount of deposited snow on the upper portion of the bottom plate 110 is less than a preset degree on the basis of the image information created by the deposited snow observing camera sensor 113, the control of the deposited snow removing member 115 is ended, and then the deposited snow observation time, which has been temporarily stopped, may be restarted, such that the deposited snow observation may be restarted.

According to the embodiment of the present application, the observation time determination unit 130 may determine a preset first time as the precipitation observation time when the seasonal information indicates summer.

For example, when the date information exists within a preset first period, the observation time determination unit 130 may calculate the seasonal information as summer, determine the preset first time as the precipitation observation time, determine a preset a-th time included in the first time as the rainfall observation time, and determine a preset A-th time included in the first time as the deposited snow observation time. For example, when the date information exists within a period of June 25 to June 30, a period of July 1 to July 31, a period of August 1 to August 31, or a period of September 1 to September 7, the observation time determination unit 130 may calculate the seasonal information as summer, determine the preset first time as the precipitation observation time, determine the preset a-th time included in the first time as the rainfall observation time, and determine the preset A-th time included in the first time as the deposited snow observation time. For example, the a-th time may be one minute, and the A-th time may be 60 minutes.

As another example, when the astronomical information includes information in which a position of the sun on the celestial sphere is positioned in a region of a circle having a diameter corresponding to an imaginary line connecting the summer solstitial point and the autumnal equinoctial point, the observation time determination unit 130 may calculate the seasonal information as summer, determine the preset first time as the precipitation observation time, determine the preset a-th time included in the first time as the rainfall observation time, and determine the preset A-th time included in the first time as the deposited snow observation time.

As another example, when a meridian altitude of the sun is positioned within a preset first meridian altitude section in image information created by capturing an image of the sky by the sky-view monitoring camera sensor 113, the observation time determination unit 130 may calculate the seasonal information as summer, determine the preset first time as the precipitation observation time, determine the preset a-th time included in the first time as the rainfall observation time, and determine the preset A-th time included in the first time as the deposited snow observation time.

As another example, the date information exists within a period from a first day of the corresponding year when an average daily atmospheric temperature rises to a temperature equal to or higher than a preset first threshold temperature and then does not fall to a temperature lower than the first threshold temperature to a day before a first day of the corresponding year when an average daily atmospheric temperature falls to a temperature lower than the first threshold temperature and then does not rise to a temperature equal to or higher than the first threshold temperature, the observation time determination unit 130 may calculate the seasonal information as summer, determine the preset first time as the precipitation observation time, determine the preset a-th time included in the first time as the rainfall observation time, and determine the preset A-th time included in the first time as the deposited snow observation time. For example, the first threshold temperature may be 20 degrees Celsius.

As another example, when preset first seasonal indicator biomass corresponding to the position information of the present apparatus 100 is included in image information created by capturing an image of a periphery of the present apparatus 100, the observation time determination unit 130 may calculate the seasonal information as summer, determine the preset first time as the precipitation observation time, determine the preset a-th time included in the first time as the rainfall observation time, and determine the preset A-th time included in the first time as the deposited snow observation time.

According to the embodiment of the present application, the observation time determination unit 130 may determine a preset second time as the precipitation observation time when the seasonal information indicates winter.

For example, when the date information exists within a preset second period, the observation time determination unit 130 may calculate the seasonal information as winter, determine the preset second time as the precipitation observation time, determine a preset b-th time included in the second time as the rainfall observation time, and determine a preset B-th time included in the second time as the deposited snow observation time. For example, when the date information exists within a period of November 27 to November 30, a period of December 1 to December 31, a period of January 1 to January 31, or a period of February 1 to March 1, the observation time determination unit 130 may calculate the seasonal information as winter, determine the preset second time as the precipitation observation time, determine the preset b-th time included in the second time as the rainfall observation time, and determine the preset B-th time included in the second time as the deposited snow observation time. For example, the b-th time may be 20 minutes, and the B-th time may be 10 minutes.

As another example, when the astronomical information includes information in which a position of the sun on the celestial sphere is positioned in a region of a circle having a diameter corresponding to an imaginary line connecting the winter solstitial point and the vernal equinoctial point, the observation time determination unit 130 may calculate the seasonal information as winter, determine the second time as the precipitation observation time, determine the preset b-th time included in the second time as the rainfall observation time, and determine the preset B-th time included in the second time as the deposited snow observation time.

As another example, when a meridian altitude of the sun is positioned within a preset second meridian altitude section in image information created by capturing an image of the sky, the observation time determination unit 130 may calculate the seasonal information as winter, determine the second time as the precipitation observation time, determine the preset b-th time included in the second time as the rainfall observation time, and determine the preset B-th time included in the second time as the deposited snow observation time.

As another example, when the date information exists within a period from a first day of the corresponding year when an average daily atmospheric temperature falls to a temperature lower than a preset second threshold temperature and then does not rise to a temperature equal to or higher than the second threshold temperature to a day before a first day of the next year when an average daily atmospheric temperature rises to a temperature equal to or higher than the second threshold temperature and then does not fall to a temperature lower than the second threshold temperature, the observation time determination unit 130 may calculate the seasonal information as winter, determine the preset second time as the precipitation observation time, determine the preset b-th time included in the second time as the rainfall observation time, and determine the preset B-th time included in the second time as the deposited snow observation time. For example, the second threshold temperature may be 5 degrees Celsius.

As another example, when preset second seasonal indicator biomass corresponding to the position information of the present apparatus 100 is included in image information created by capturing an image of the periphery of the present apparatus 100, the observation time determination unit 130 may calculate the seasonal information as winter, determine the preset second time as the precipitation observation time, determine the preset b-th time included in the second time as the rainfall observation time, and determine the preset B-th time included in the second time as the deposited snow observation time.

According to the embodiment of the present application, the observation time determination unit 130 may determine a preset third time as the precipitation observation time when the seasonal information indicates spring.

For example, when the date information exists within a preset third period, the observation time determination unit 130 may calculate the seasonal information as spring, determine the preset third time as the precipitation observation time, determine a preset c-th time included in the third time as the rainfall observation time, and determine a preset C-th time included in the third time as the deposited snow observation time. For example, when the date information exists within a period of March 2 to March 31, a period of April 1 to April 30, a period of May 1 to May 31, or a period of June 1 to June 24, the observation time determination unit 130 may calculate the seasonal information as spring, determine the third time as the precipitation observation time, determine the preset c-th time included in the third time as the rainfall observation time, and determine the preset C-th time included in the third time as the deposited snow observation time. For example, the c-th time may be 10 minutes, and the C-th time may be 30 minutes.

As another example, when the astronomical information includes information in which a position of the sun on the celestial sphere is positioned in a region of a circle having a diameter corresponding to an imaginary line connecting the vernal equinoctial point and the summer solstitial point, the observation time determination unit 130 may calculate the seasonal information as spring, determine the third time as the precipitation observation time, determine the preset c-th time included in the third time as the rainfall observation time, and determine the preset C-th time included in the third time as the deposited snow observation time.

As another example, when a meridian altitude of the sun is positioned within a preset third meridian altitude section in image information created by capturing an image of the sky, the observation time determination unit 130 may calculate the seasonal information as spring, determine the third time as the precipitation observation time, determine the preset c-th time included in the third time as the rainfall observation time, and determine the preset C-th time included in the third time as the deposited snow observation time.

As another example, when the date information exists within a period from a first day of the corresponding year when an average daily atmospheric temperature rises to a temperature equal to or higher than the preset second threshold temperature and then does not fall to a temperature lower than the second threshold temperature to a day before a first day of the corresponding year when an average daily atmospheric temperature rises to a temperature equal to or higher than the first threshold temperature and then does not fall to a temperature lower than the first threshold temperature, the observation time determination unit 130 may calculate the seasonal information as spring, determine the preset third time as the precipitation observation time, determine the preset c-th time included in the third time as the rainfall observation time, and determine the preset C-th time included in the third time as the deposited snow observation time. For example, the first threshold temperature may be 20 degrees Celsius. The second threshold temperature may be 5 degrees Celsius.

As another example, when preset third seasonal indicator biomass corresponding to the position information of the present apparatus 100 is included in image information created by capturing an image of the periphery of the present apparatus 100, the observation time determination unit 130 may calculate the seasonal information as spring, determine the preset third time as the precipitation observation time, determine the preset c-th time included in the third time as the rainfall observation time, and determine the preset C-th time included in the third time as the deposited snow observation time.

According to the embodiment of the present application, the observation time determination unit 130 may determine a preset fourth time as the precipitation observation time when the seasonal information indicates autumn.

For example, when the date information exists within a preset fourth period, the observation time determination unit 130 may calculate the seasonal information as autumn, determine the preset fourth time as the precipitation observation time, determine a preset d-th time included in the fourth time as the rainfall observation time, and determine a preset D-th time included in the fourth time as the deposited snow observation time. For example, when the date information exists within a period of September 8 to September 30, a period of October 1 to October 31, or a period of November 1 to November 26, the observation time determination unit 130 may calculate the seasonal information as autumn, determine the fourth time as the precipitation observation time, determine the preset d-th time included in the fourth time as the rainfall observation time, and determine the preset D-th time included in the fourth time as the deposited snow observation time. For example, the d-th time may be 10 minutes, and the D-th time may be 30 minutes.

As another example, when the astronomical information includes information in which the position of the sun on the celestial sphere is positioned in a region of a circle having a diameter corresponding to an imaginary line connecting the autumnal equinoctial point and the winter solstitial point, the observation time determination unit 130 may calculate the seasonal information as autumn, determine the fourth time as the precipitation observation time, determine the preset d-th time included in the fourth time as the rainfall observation time, and determine the preset D-th time included in the fourth time as the deposited snow observation time.

As another example, when a meridian altitude of the sun is positioned within a preset fourth meridian altitude section in image information created by capturing an image of the sky, the observation time determination unit 130 may calculate the seasonal information as autumn, determine the fourth time as the precipitation observation time, determine the preset d-th time included in the fourth time as the rainfall observation time, and determine the preset D-th time included in the fourth time as the deposited snow observation time.

As another example, when the date information exists within a period from a first day of the corresponding year when an average daily atmospheric temperature falls to a temperature lower than the preset first threshold temperature and then does not rise to a temperature equal to or higher than the first threshold temperature to a day before a first day of the corresponding year when an average daily atmospheric temperature falls to a temperature lower than the second threshold temperature and then does not rise to a temperature equal to or higher than the second threshold temperature, the observation time determination unit 130 may calculate the seasonal information as autumn, determine the preset fourth time as the precipitation observation time, determine the preset d-th time included in the fourth time as the rainfall observation time, and determine the preset D-th time included in the fourth time as the deposited snow observation time. For example, the first threshold temperature may be 20 degrees Celsius. The second threshold temperature may be 5 degrees Celsius.

As another example, when preset fourth seasonal indicator biomass corresponding to the position information of the present apparatus 100 is included in image information created by capturing an image of the periphery of the present apparatus 100, the observation time determination unit 130 may calculate the seasonal information as autumn, determine the preset fourth time as the precipitation observation time, determine the preset d-th time included in the fourth time as the rainfall observation time, and determine the preset D-th time included in the fourth time as the deposited snow observation time.

As another example, among the a-th time to the d-th time, the a-th time may be relatively shortest, the b-th time may be relatively longest, the c-th time and the d-th time may be longer than the a-th time and shorter than the b-th time. The c-th time and the d-th time may be equal to each other. In addition, among the A-th time to the D-th time, the A-th time may be relatively longest, and the B-th time may be relatively shortest, and the C-th time and the D-th time may be shorter than the A-th time and longer than the B-th time. The C-th time and the D-th time may be equal to each other.

According to the embodiment of the present application, the observation time determination unit 130 may decrease the precipitation observation time by a preset degree when the precipitation amount per unit time is equal to or more than the preset degree.

For example, when the precipitation amount per unit time within a preset radius of the present apparatus 100 increases to a first threshold precipitation amount per unit time during the rainfall observation, the observation time determination unit 130 may decrease the remaining precipitation observation time to a preset first rate. For example, assuming that the first threshold precipitation amount per unit time is 7 mm/h, the precipitation amount per unit time increases from 5 mm/h to 8 mm/h during the precipitation observation, the remaining precipitation observation time is 10 minutes at a time point at which the precipitation amount per unit time is 7 mm/h, and the first rate is 90%, the observation time determination unit 130 may decrease the remaining precipitation observation time from 10 minutes to 9 minutes, which is 90% of 10 minutes, at a time point at which the precipitation amount per unit time is the first threshold precipitation amount per unit time of 7 mm/h. In addition, the first threshold precipitation amount per unit time may include at least one of a first threshold rainfall amount per unit time and a first threshold deposited snow amount per unit time. In addition, when a rainfall amount per unit time within the preset radius of the present apparatus 100 increases to be equal to or higher than the preset first threshold rainfall amount per unit time included in the first threshold precipitation amount per unit time during the rainfall observation, the observation time determination unit 130 may decrease the remaining rainfall observation time to a preset a-th rate included in the first rate. When a deposited snow amount per unit time within the preset radius of the present apparatus 100 increases to be equal to or higher than the preset first threshold deposited snow amount per unit time included in the first threshold precipitation amount per unit time during the deposited snow observation, the observation time determination unit 130 may decrease the remaining deposited snow observation time to a preset A-th rate included in the first rate.

On the contrary, when the precipitation amount per unit time within the preset radius of the present apparatus 100 decreases to be equal to or lower than the first threshold precipitation amount per unit time during the rainfall observation, the observation time determination unit 130 may increase the remaining precipitation observation time by a reciprocal number of the preset first rate. For example, assuming that the first threshold precipitation amount per unit time is 11 mm/h, the precipitation amount per unit time decreases from 12 mm/h to 10 mm/h during the precipitation observation, the remaining precipitation observation time is 8 minutes at a time point at which the precipitation amount per unit time is lower than 10 mm/h, and the first rate is 50%, the observation time determination unit 130 may increase the remaining precipitation observation time from 8 minutes to 12 minutes, which is 150% of 8 minutes, at a time point at which the precipitation amount per unit time is lower than the first threshold precipitation amount per unit time of 10 mm/h. In addition, when the rainfall amount per unit time within the preset radius of the present apparatus 100 decreases to be lower than the first threshold rainfall amount per unit time during the rainfall observation, the observation time determination unit 130 may increase the remaining rainfall observation time by a reciprocal number of the a-th rate. When the deposited snow amount per unit time within the preset radius of the present apparatus 100 decreases to be lower than the first threshold deposited snow amount per unit time during the deposited snow observation, the observation time determination unit 130 may increase the remaining deposited snow observation time by a reciprocal number of the A-th rate.

As another example, the observation time determination unit 130 may set a first threshold unit precipitation amount, the first rate corresponding to the first threshold unit precipitation amount, an n-th threshold unit precipitation amount, and an n-th rate corresponding to the n-th threshold unit precipitation amount. n may be a positive integer of two or more.

According to the embodiment of the present application, the control unit 140 may end the rainfall observation when snowfall is detected during the rainfall observation.

For example, when the present apparatus 100 detects snowfall during the rainfall observation, the control unit 140 ends the rainfall observation. When the snowfall, which has been detected, is not detected and rainfall is detected after the observation time determination unit 130 stops the remaining rainfall observation time, the observation time determination unit 130 may restart the rainfall observation with the remaining rainfall observation time at the time point at which the remaining rainfall observation time has been stopped. In addition, when the present apparatus 100 detects rainfall during the snowfall observation, the control unit 140 ends the snowfall observation. When the rainfall, which has been detected, is not detected and snowfall is detected after the observation time determination unit 130 stops the remaining snowfall observation time, the observation time determination unit 130 may restart the snowfall observation with the remaining snowfall observation time at the time point at which the remaining snowfall observation time has been stopped.

As another example, when the present apparatus 100 receives, from the external server 300, information indicating that a freezing level is positioned at a level lower than a preset altitude from the ground surface within the preset radius based on the present apparatus 100 during the rainfall observation of the present apparatus 100, the present apparatus 100 determines that snowfall has occurred or snowfall will occur within a preset time, and the control unit 140 of the present apparatus 100 may end the rainfall observation. When the present apparatus 100 detects snowfall during the rainfall observation and ends the rainfall observation, the observation time determination unit 130 stops the remaining rainfall observation time. Thereafter, when the present apparatus 100 receives, from the external server 300, information indicating that the freezing level is positioned at a level equal to or higher than the preset altitude from the ground surface within the preset radius based on the present apparatus 100 and rainfall is detected, the observation time determination unit 130 may restart the rainfall observation with the remaining rainfall observation time at the time point at which the remaining rainfall observation time has been stopped.

On the contrary, when the present apparatus 100 receives, from the external server 300, information indicating that the freezing level is positioned at a level equal to or higher than the preset altitude from the ground surface within the preset radius based on the present apparatus 100 during the snowfall observation of the present apparatus 100, the present apparatus 100 determines that snowfall has not occurred or snowfall will not occur within a preset time, and the control unit 140 of the present apparatus 100 may end the snowfall observation. When the present apparatus 100 detects rainfall during the snowfall observation and ends the snowfall observation, the observation time determination unit 130 stops the remaining snowfall observation time. Thereafter, when the present apparatus 100 receives, from the external server 300, information indicating that the freezing level is positioned at a level lower than the preset altitude from the ground surface within the preset radius based on the present apparatus 100 and snowfall is detected, the observation time determination unit 130 may restart the snowfall observation with the remaining snowfall observation time at the time point at which the remaining snowfall observation time has been stopped.

As another example, when an atmospheric temperature at the periphery of the present apparatus 100 is lower than a preset threshold atmospheric temperature during the rainfall observation of the present apparatus 100, the present apparatus 100 determines that snowfall has occurred or snowfall will occur within a preset time, and the control unit 140 of the present apparatus 100 may end the rainfall observation. When the present apparatus 100 determines that snowfall has occurred or snowfall will occur within the preset time during the rainfall observation and the control unit 140 ends the rainfall observation, the observation time determination unit 130 stops the remaining rainfall observation time. Thereafter, when an atmospheric temperature at the periphery of the present apparatus 100 is equal to or higher than the threshold atmospheric temperature and rainfall is detected, the observation time determination unit 130 may restart the rainfall observation with the remaining rainfall observation time at the time point at which the remaining rainfall observation time has been stopped.

On the contrary, when an atmospheric temperature at the periphery of the present apparatus 100 is equal to or higher than the preset threshold atmospheric temperature during the snowfall observation of the present apparatus 100, the present apparatus 100 determines that snowfall has not occurred or snowfall will not occur within a preset time, and the control unit 140 of the present apparatus 100 may end the snowfall observation. When the present apparatus 100 determines that snowfall has not occurred or snowfall will not occur within the preset time during the snowfall observation and the control unit 140 ends the snowfall observation, the observation time determination unit 130 stops the remaining snowfall observation time. Thereafter, when an atmospheric temperature at the periphery of the present apparatus 100 is lower than the threshold atmospheric temperature and snowfall is detected, the observation time determination unit 130 may restart the snowfall observation with the remaining snowfall observation time at the time point at which the remaining snowfall observation time has been stopped.

According to the embodiment of the present application, the control unit 140 may end the rainfall observation when a wet-bulb temperature is lower than a preset threshold wet-bulb temperature.

For example, when a wet-bulb temperature at the periphery of the present apparatus 100 is lower than a preset threshold wet-bulb temperature during the rainfall observation of the present apparatus 100, the present apparatus 100 determines that snowfall has occurred or snowfall will occur within a preset time, and the control unit 140 of the present apparatus 100 may end the rainfall observation. When the present apparatus 100 determines that snowfall has occurred or snowfall will occur within the preset time during the rainfall observation and the control unit 140 ends the rainfall observation, the observation time determination unit 130 may stop the remaining rainfall observation time.

On the contrary, when a wet-bulb temperature at the periphery of the present apparatus 100 is equal to or higher than the preset threshold wet-bulb temperature during the snowfall observation of the present apparatus 100, the present apparatus 100 determines that snowfall has not occurred or snowfall will not occur within a preset time, and the control unit 140 of the present apparatus 100 may end the snowfall observation. When the present apparatus 100 determines that snowfall has not occurred or snowfall will not occur within a preset time during the snowfall observation and the control unit 140 ends the snowfall observation, the observation time determination unit 130 may stop the remaining snowfall observation time.

According to the embodiment of the present application, the control unit 140 may start the rainfall observation when a wet-bulb temperature is equal to or higher than the threshold wet-bulb temperature.

For example, when the present apparatus 100 determines that snowfall has occurred or snowfall will occur within the preset time during the rainfall observation and the control unit 140 ends the rainfall observation, the observation time determination unit 130 stops the remaining rainfall observation time. Thereafter, when a wet-bulb temperature at the periphery of the present apparatus 100 is equal to or higher than the threshold wet-bulb temperature and rainfall is detected, the observation time determination unit 130 may restart the rainfall observation with the remaining rainfall observation time at the time point at which the remaining rainfall observation time has been stopped.

On the contrary, when the present apparatus 100 determines that snowfall has not occurred or snowfall will not occur within the preset time during the snowfall observation and the control unit 140 ends the snowfall observation, the observation time determination unit 130 stops the remaining snowfall observation time. Thereafter, when a wet-bulb temperature at the periphery of the present apparatus 100 is lower than the threshold wet-bulb temperature and snowfall is detected, the observation time determination unit 130 may restart the snowfall observation with the remaining snowfall observation time at the time point at which the remaining snowfall observation time has been stopped.

According to the embodiment of the present application, the control unit 140 may end the rainfall observation when a water equivalent ratio is equal to or higher than a preset degree.

For example, when a water equivalent ratio to the atmosphere at the periphery of the present apparatus 100 is equal to or higher than the preset degree during the rainfall observation of the present apparatus 100, the present apparatus 100 determines that snowfall has occurred or snowfall will occur within a preset time, and the control unit 140 of the present apparatus 100 may end the rainfall observation. When the present apparatus 100 determines that snowfall has occurred or snowfall will occur within the preset time during the rainfall observation and the control unit 140 ends the rainfall observation, the observation time determination unit 130 stops the remaining rainfall observation time. Thereafter, when a water equivalent ratio to the atmosphere at the periphery of the present apparatus 100 is lower than the preset degree and rainfall is detected, the observation time determination unit 130 may restart the rainfall observation with the remaining rainfall observation time at the time point at which the remaining rainfall observation time has been stopped.

On the contrary, when a water equivalent ratio to the atmosphere at the periphery of the present apparatus 100 is lower than the preset degree during the snowfall observation of the present apparatus 100, the present apparatus 100 determines that snowfall has not occurred or snowfall will not occur within a preset time, and the control unit 140 of the present apparatus 100 may end the snowfall observation. When the present apparatus 100 determines that snowfall has not occurred or snowfall will not occur within the preset time during the snowfall observation and the control unit 140 ends the snowfall observation, the observation time determination unit 130 stops the remaining snowfall observation time. Thereafter, when a water equivalent ratio to the atmosphere at the periphery of the present apparatus 100 is equal to or higher than the preset degree and snowfall is detected, the observation time determination unit 130 may restart the snowfall observation with the remaining snowfall observation time at the time point at which the remaining snowfall observation time has been stopped.

According to the embodiment of the present application, the control unit 140 may end the rainfall observation when snow density is lower than a preset degree.

For example, when snow density to the atmosphere at the periphery of the present apparatus 100 is lower than the preset degree during the rainfall observation of the present apparatus 100, the present apparatus 100 determines that snowfall has occurred or snowfall will occur within a preset time, and the control unit 140 of the present apparatus 100 may end the rainfall observation. When the present apparatus 100 determines that snowfall has occurred or snowfall will occur within the preset time during the rainfall observation and the control unit 140 ends the rainfall observation, the observation time determination unit 130 stops the remaining rainfall observation time. Thereafter, when snow density to the atmosphere at the periphery of the present apparatus 100 is equal to or higher than the preset degree and rainfall is detected, the observation time determination unit 130 may restart the rainfall observation with the remaining rainfall observation time at the time point at which the remaining rainfall observation time has been stopped.

On the contrary, when snow density to the atmosphere at the periphery of the present apparatus 100 is equal to or higher than the preset degree during the snowfall observation of the present apparatus 100, the present apparatus 100 determines that snowfall has not occurred or snowfall will not occur within a preset time, and the control unit 140 of the present apparatus 100 may end the snowfall observation. When the present apparatus 100 determines that snowfall has not occurred or snowfall will not occur within the preset time during the snowfall observation and the control unit 140 ends the snowfall observation, the observation time determination unit 130 stops the remaining snowfall observation time. Thereafter, when snow density to the atmosphere at the periphery of the present apparatus 100 is lower than the preset degree and snowfall is detected, the observation time determination unit 130 may restart the snowfall observation with the remaining snowfall observation time at the time point at which the remaining snowfall observation time has been stopped.

For example, the configuration in which the present apparatus 100 determines that snowfall has occurred or snowfall will occur within a preset time may mean that snowfall is detected. On the contrary, the configuration in which the present apparatus 100 determines that rainfall has occurred or rainfall will occur within a preset time may mean that rainfall is detected.

FIG. 5 is a view schematically illustrating an operation of opening or closing a lid 111*b* of the precipitation gauge 111 according to the embodiment of the present application.

Figure 5A:
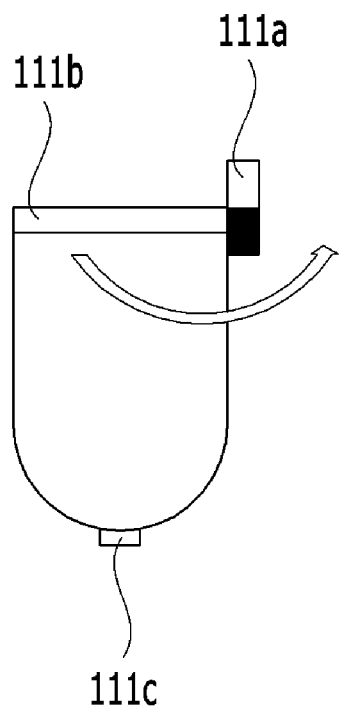
FIGS. 5A and 5B are views schematically illustrating an operation of opening or closing a lid of a precipitation gauge according to the embodiment of the present application.
Figure 5B:
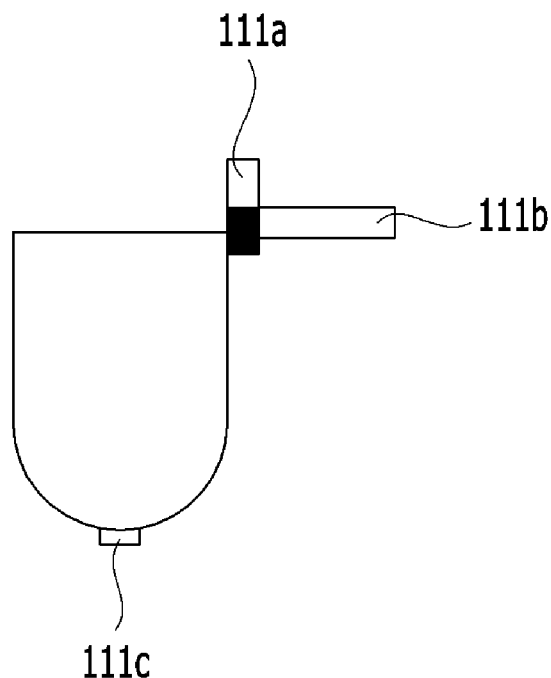

With reference to FIG. 5, the precipitation gauge 111 may include the precipitation detection sensor 111*a*, the lid 111*b*, and a drain port 111*c*. With reference to FIG. 5A, the closed precipitation gauge 111 may be identified. The lid 111*b*, which closes the precipitation gauge 111, may rotate about a shaft on which the precipitation detection sensor 111*a* is provided. With reference to FIG. 5B, the opened precipitation gauge 111 may be identified. When the lid 111*b* rotates about the shaft on which the precipitation detection sensor 111*a* is provided, the precipitation gauge 111 may be opened, and the precipitation gauge 111 may accommodate water. However, the operation of opening or closing the lid 111*b* is not limited to the rotation.

According to the embodiment of the present application, the plurality of precipitation gauges 111 may each include the lid 111*b* and the drain port 111*c* that are opened or closed by being controlled.

For example, the plurality of precipitation gauges 111 may each include the precipitation detection sensor 111*a*. When the precipitation detection sensor 111*a* detects precipitation, the control unit 140 may perform control to open the precipitation gauge 111 by horizontally rotating the lid 111*b* about the shaft on which the precipitation detection sensor 111*a* is provided. The control unit 140 may horizontally rotate the lid 111*b* in a preset direction and at a preset speed to open the precipitation gauge 111. In addition, when the precipitation observation time determined by the observation time determination unit 130 elapses after the precipitation gauge 111 is opened, the control unit 140 may perform control to close the precipitation gauge 111 by horizontally rotating the lid 111*b* about the shaft on which the precipitation detection sensor 111*a* is provided. The control unit 140 may horizontally rotate the lid 111*b* in a preset direction and at a preset speed to close the precipitation gauge 111. In addition, when the precipitation observation is ended even though the precipitation observation time determined by the observation time determination unit 130 remains after the precipitation gauge 111 is opened, the control unit 140 may perform control to close the precipitation gauge 111 by horizontally rotating the lid 111*b* about the shaft on which the precipitation detection sensor 111*a* is provided.

In addition, the present apparatus 100 may obtain the precipitation amount by measuring water in the precipitation gauge 111.

In addition, after the present apparatus 100 obtains the precipitation amount, the control unit 140 may drain the water in the precipitation gauge 111 by a preset drain amount per unit time by controlling the drain port 111*c*. In this case, the configuration in which the present apparatus 100 obtains the precipitation amount may mean that the present apparatus 100 calculates the precipitation amount by sensing the water in the precipitation gauge 111.

In addition, at least one drain port 111*c* may be provided on the precipitation gauge 111. In addition, the drain port 111*c* may be opened or closed by being controlled, and a diameter of the drain port 111*c*, which is opened or closed, may also be adjusted.

In addition, the precipitation gauge 111 may have a member that increases pressure in the precipitation gauge 111 by being controlled. The precipitation gauge 111 may use the member, which increases pressure in the precipitation gauge 111, during a process of draining the water, to increase the pressure in the precipitation gauge 111 to a preset degree or higher, thereby increasing a speed of draining the water.

According to the embodiment of the present application, the lid 111*b* may be provided on an upper portion of the precipitation gauge 111.

For example, the lid 111*b* provided on the upper portion of the precipitation gauge 111 is horizontally rotated by being controlled by the control unit 140 in a preset direction and at a preset speed about the shaft on which the precipitation detection sensor 111*a* is positioned. When an error degree between direction information and speed information included in a control instruction and actual direction information and actual speed information of an actual horizontal rotation of the lid 111*b* is equal to or higher than a preset degree, the control unit 140 may end the observation, the movement unit 120 may control the movable member 112 to move the present apparatus 100 from the second position to the first position, the present apparatus 100 may transmit a repair requirement notification related to the lid 111*b* to the user terminal 200, and the present apparatus 100 may transfer repair request information to a repairer terminal. The repair request information may include presumed abnormal part information of the lid 111*b*, a request deadline, and the like.

According to the embodiment of the present application, the drain port 111*c* may be provided on a lower portion of the precipitation gauge 111.

For example, the drain port 111*c* provided on the lower portion of the precipitation gauge 111 drains the water in the precipitation gauge 111 by a preset drain amount per unit time under the control of the control unit 140. When an error degree between drain amount per unit time information included in a control instruction and actual drain amount per unit time information of the drain port 111*c* is equal to or higher than a preset degree, the control unit 140 may end the drain process, the movement unit 120 may control the movable member 112 to move the present apparatus 100 from the second position to the first position, the present apparatus 100 may transmit a repair requirement notification related to the drain port 111*c* to the user terminal 200, and the present apparatus 100 may transfer repair request information to the repairer terminal. The repair request information may include presumed abnormal part information of the drain port 111*c*, a request deadline, and the like.

According to the embodiment of the present application, the control unit 140 may open the lid 111*b* for the precipitation observation time.

For example, the control unit 140 may perform control for the precipitation observation time in the state in which the lid 111*b* provided on the upper portion of the precipitation gauge 111 is opened and the drain port 111*c* is closed.

As another example, the control unit 140 may perform control for the precipitation observation time in the state in which the lid 111*b* of the precipitation gauge 111 is opened and the drain port 111*c* is opened so that the water accommodated in the precipitation gauge 111 is drained within a preset time. When the water comes into contact with the precipitation gauge 111, the present apparatus 100 may obtain the precipitation amount per unit time in consideration of intensity of the precipitation amount per unit time and a weight of the water sensed at the moment of the contact, and the present apparatus 100 may calculate the precipitation amount in consideration of the precipitation amount per unit time and the precipitation observation time.

According to the embodiment of the present application, the control unit 140 may close the lid 111*b* when the precipitation observation time has elapsed.

For example, when the lid 111*b* provided on the upper portion of the precipitation gauge 111 is closed, the present apparatus 100 may obtain the precipitation amount by measuring the water in the precipitation gauge 111, and then the control unit 140 may perform control to open the drain port 111*c*.

As another example, when rainfall and snowfall are not detected after the precipitation observation time elapses and the precipitation amount is measured, the control unit 140 may perform control to maintain the state in which the lid 111*b* and the drain port 111*c* are opened until humidity in the precipitation gauge 111 becomes lower than a preset degree. In a climate where rainfall and snowfall do not occur, when the present apparatus 100 does not observe the precipitation, the present apparatus 100 opens the lid 111*b* and the drain port 111c of the precipitation gauge 111 to increase an evaporation rate in the precipitation gauge 111, thereby increasing accuracy of a precipitation amount measurement value at the time of measuring the precipitation amount later by using the precipitation gauge 111.

According to the embodiment of the present application, when a water level in the first precipitation gauge 111 exceeds a preset threshold water level before the precipitation observation time is ended, the control unit 140 may close the lid 111b of the first precipitation gauge 111 and open the lid 111b of the second precipitation gauge 111.

For example, the first precipitation gauge 111 may include at least one precipitation gauge 111, and the second precipitation gauge 111 may include at least one precipitation gauge 111 that is not the first precipitation gauge 111. The control unit 140 may set the plurality of precipitation gauges 111, which is symmetric with respect to the bottom plate 110, as the first precipitation gauge 111 and the second precipitation gauge 111. As the control unit 140 sets the plurality of precipitation gauges 111, which is symmetric with respect to the bottom plate 110, as the first precipitation gauge 111 and the second precipitation gauge 111, it is possible to obtain an effect of stably operating the present apparatus 100 by the movement unit 120 that operates while accommodating the water.

As another example, on the basis of at least one of the speeds and the time points at which the lid 111b of the first precipitation gauge 111 is opened and closed, the control unit 140 may set the speeds and the time points at which the drain port 111c of the first precipitation gauge 111 is opened and closed and set the speeds and the time points at which the lid 111b and the drain port 111c of the second precipitation gauge 111 are opened and closed. For example, the control unit 140 may perform setting so that the speed of opening the lid 111b of the first precipitation gauge 111 and the speed of closing the lid 111b of the second precipitation gauge 111 are equal to each other and the speed of closing the lid 111b of the first precipitation gauge 111 and the speed of opening the lid 111b of the second precipitation gauge 111 are equal to each other. In addition, when the present apparatus 100 detects the precipitation and does not end the precipitation observation, the control unit 140 may perform control to start the operation of closing the lid 111b of the first precipitation gauge 111 at a time point at which the water in the first precipitation gauge 111 exceeds the threshold water level after opening the lid 111b of the first precipitation gauge 111, and the control unit 140 may perform control to start the operation of opening the lid 111b of the second precipitation gauge 111 at a time point at which the water in the first precipitation gauge 111 exceeds the threshold water level after opening the lid 111b of the first precipitation gauge 111. In addition, when the present apparatus 100 detects the precipitation and does not end the precipitation observation, the control unit 140 may perform control to start the operation of closing the lid 111b of the second precipitation gauge 111 at a time point at which the water in the second precipitation gauge 111 exceeds the threshold water level after opening the lid 111b of the second precipitation gauge 111, and the control unit 140 may perform control to start the operation of opening the lid 111b of the first precipitation gauge 111 at a time point at which the water in the second precipitation gauge 111 exceeds the threshold water level after opening the lid 111b of the second precipitation gauge 111.

Figure 6:
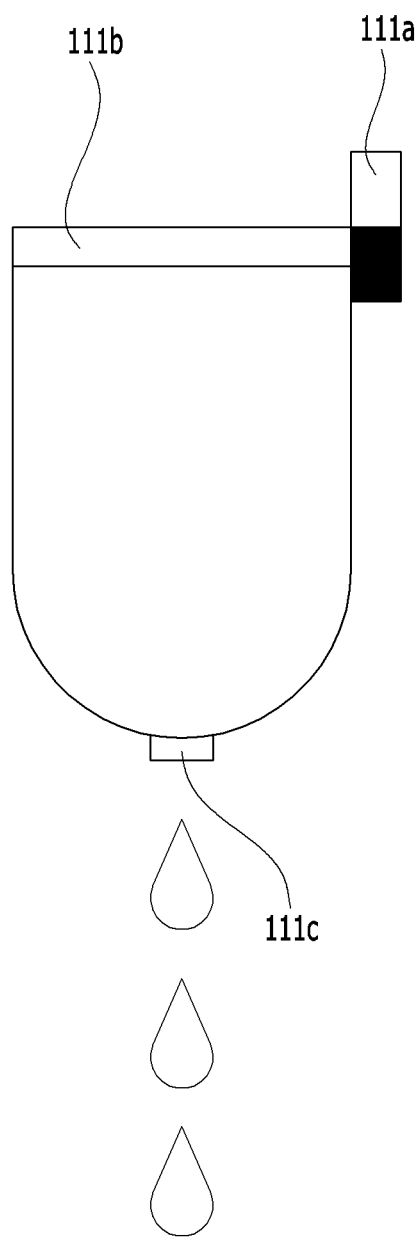
FIG. 6 is a view schematically illustrating a water draining operation of the precipitation gauge according to the embodiment of the present application.

FIG. 6 is a view schematically illustrating a water draining operation of the precipitation gauge 111 according to the embodiment of the present application.

With reference to FIG. 6, the precipitation gauge 111 may be controlled to drain the water through the drain port 111c provided at the lower portion of the precipitation gauge 111.

According to the embodiment of the present application, when the lid 111b of the precipitation gauge 111 is closed or the observation is ended, the control unit 140 may sense the water in the precipitation gauge 111 and then open the drain port 111c to discharge the water.

For example, the control unit 140 may perform control to start the operation of opening the drain port 111c of the first precipitation gauge 111 after sensing the water in the first precipitation gauge 111 after closing the lid 111b of the first precipitation gauge 111, and the control unit 140 may set the drain amount per unit time of the first precipitation gauge 111 so that a decrease rate of the water in the first precipitation gauge 111 is higher than an increase rate of the water in the second precipitation gauge 111. In addition, the control unit 140 may perform control to start the operation of opening the drain port 111c of the second precipitation gauge 111 after sensing the water in the second precipitation gauge 111 after closing the lid 111b of the second precipitation gauge 111, and the control unit 140 may set the drain amount per unit time of the second precipitation gauge 111 so that a decrease rate of the water in the second precipitation gauge 111 is higher than an increase rate of the water in the first precipitation gauge 111. In order to increase the drain amount per unit time, the control unit 140 may selectively control the plurality of drain ports 111c provided on the precipitation gauge 111, increase an opening diameter of the drain port 111c, or increase the pressure in the precipitation gauge 111.

Figure 7:
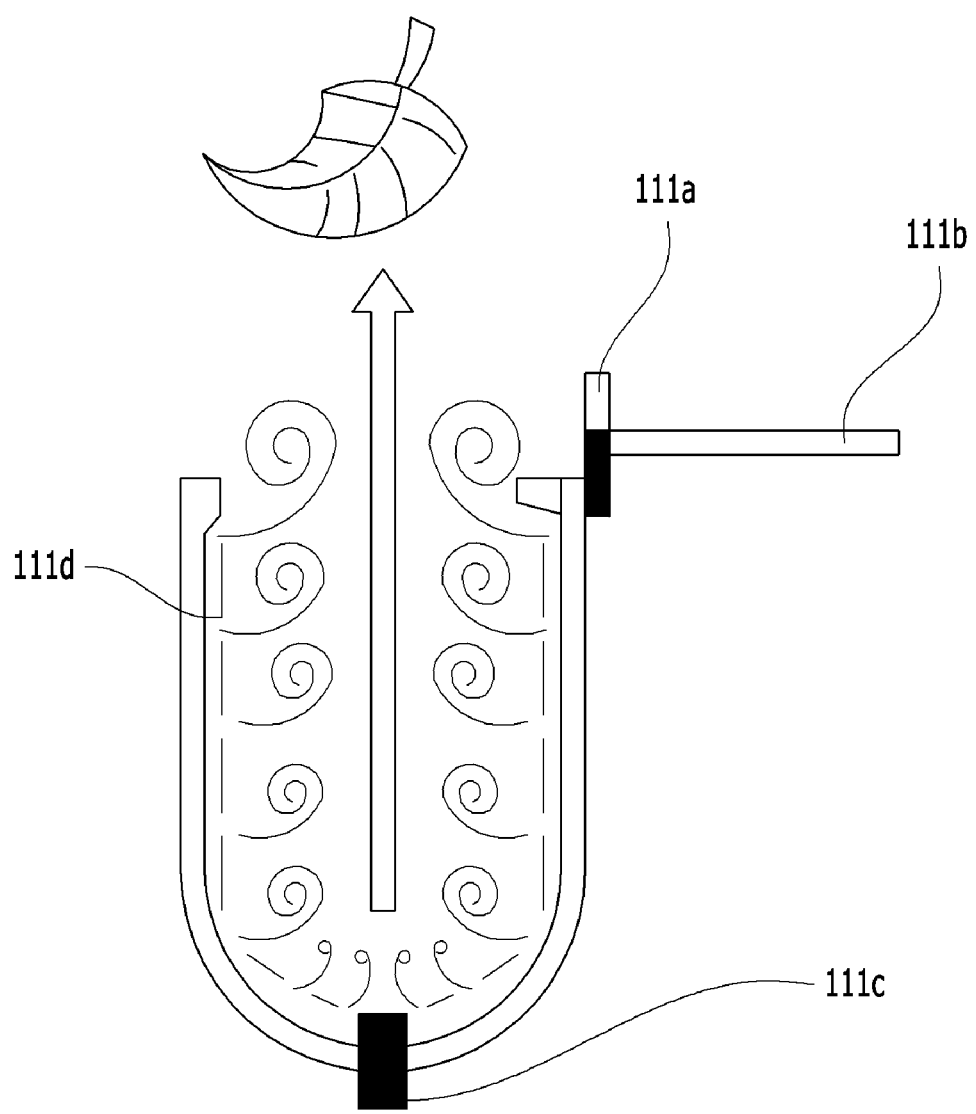
FIG. 7 is a view schematically illustrating an operation of an air blower provided in the precipitation gauge according to the embodiment of the present application.

FIG. 7 is a view schematically illustrating operations of air blowers 111d provided in the precipitation gauge 111 according to the embodiment of the present application.

With reference to FIG. 7, the precipitation gauge 111 may have at least one air blower 111d (a spray port of the air blower 111d). When the air blower 111d provided in the precipitation gauge 111 sprays air, a flow of air flowing from the inside to the outside of the precipitation gauge 111 may be formed, which may generate an effect of preventing foreign substances such as fallen leaves from being introduced into the precipitation gauge 111.

According to the embodiment of the present application, when foreign substances are detected in the precipitation gauge 111 with the opened lid 111b, the control unit 140 may control the air blower 111d (air-blow) provided in the precipitation gauge 111 to discharge the foreign substances.

For example, a plurality of sensors may be provided in the precipitation gauge 111. When the present apparatus 100 detects foreign substances in the precipitation gauge 111 with the opened lid 111b on the basis of sensing information, the control unit 140 may selectively control the air blower 111d, which has the spray port that is not submerged in the water among the plurality of air blowers 111d provided in the precipitation gauge 111, to spray air with preset spray intensity on the basis of at least one of the image information and the sensing information until the foreign substances are discharged to the outside of the precipitation gauge 111. In addition, when the present apparatus 100 detects the introduction of foreign substances into the precipitation gauge 111 on the basis of the image information created by the camera sensor 113 configured to capture an image of the precipitation gauge 111, the control unit 140 may selectively control the air blower 111d, which has the spray port that is not submerged in the water among the plurality of air blowers 111d provided in the precipitation gauge 111, to spray air with preset spray intensity on the basis of at least one of the image information and the sensing information until the foreign substances are discharged to the outside of the precipitation gauge 111.

As another example, when rainfall and snowfall are not detected after the precipitation observation time elapses after the precipitation amount is measured, the control unit 140 may perform control to maintain the state in which the lid 111b and the drain port 111c are opened on the basis of the sensing information in the precipitation gauge 111 until humidity in the precipitation gauge 111 becomes lower than a preset degree, and the control unit 140 may perform control so that the air blower 111d provided in the precipitation gauge 111 sprays air with preset spray intensity on the basis of the sensing information in the precipitation gauge 111 until humidity in the precipitation gauge 111 becomes lower than the preset degree. In a climate where rainfall and snowfall do not occur, when the present apparatus 100 does not observe the precipitation, the present apparatus 100 opens the lid 111b and the drain port 111c of the precipitation gauge 111 to increase an evaporation rate in the precipitation gauge 111 by operating the air blower 111d, thereby increasing accuracy of a precipitation amount measurement value at the time of measuring the precipitation amount later by using the precipitation gauge 111.

According to the embodiment of the present application, when a temperature in the precipitation gauge 111 is lower than a preset threshold temperature, the control unit 140 may control a heater provided in the precipitation gauge 111 and increase the temperature in the precipitation gauge 111 to a temperature equal to or higher than a threshold temperature.

For example, when a temperature in the precipitation gauge 111 is lower than the preset threshold temperature on the basis of the sensing information, the control unit 140 may control the heater provided in the precipitation gauge 111 to apply heat with preset intensity to the precipitation gauge 111 on the basis of the sensing information until the temperature in the precipitation gauge 111 becomes a temperature equal to or higher than the threshold temperature.

As another example, when rainfall and snowfall are not detected after the precipitation observation time elapses after the precipitation amount is measured, the control unit 140 may perform control to maintain the state in which the lid 111b and the drain port 111c are opened on the basis of the sensing information in the precipitation gauge 111 until humidity in the precipitation gauge 111 becomes lower than a preset degree, and the control unit 140 may perform control so that the air blower 111d provided in the precipitation gauge 111 sprays air with preset spray intensity on the basis of the sensing information in the precipitation gauge 111 until humidity in the precipitation gauge 111 becomes lower than the preset degree. The control unit 140 may perform control so that the heater provided in the precipitation gauge 111 applies heat with preset intensity to the precipitation gauge 111 on the basis of the sensing information in the precipitation gauge 111 until humidity of the precipitation gauge 111 becomes lower than the preset degree. In a climate where rainfall and snowfall do not occur, when the present apparatus 100 does not observe the precipitation, the present apparatus 100 opens the lid 111b and the drain port 111c of the precipitation gauge 111 to increase an evaporation rate in the precipitation gauge 111 by operating the air blower 111d and the heater, thereby increasing accuracy of a precipitation amount measurement value at the time of measuring the precipitation amount later by using the precipitation gauge 111.

Figure 8:
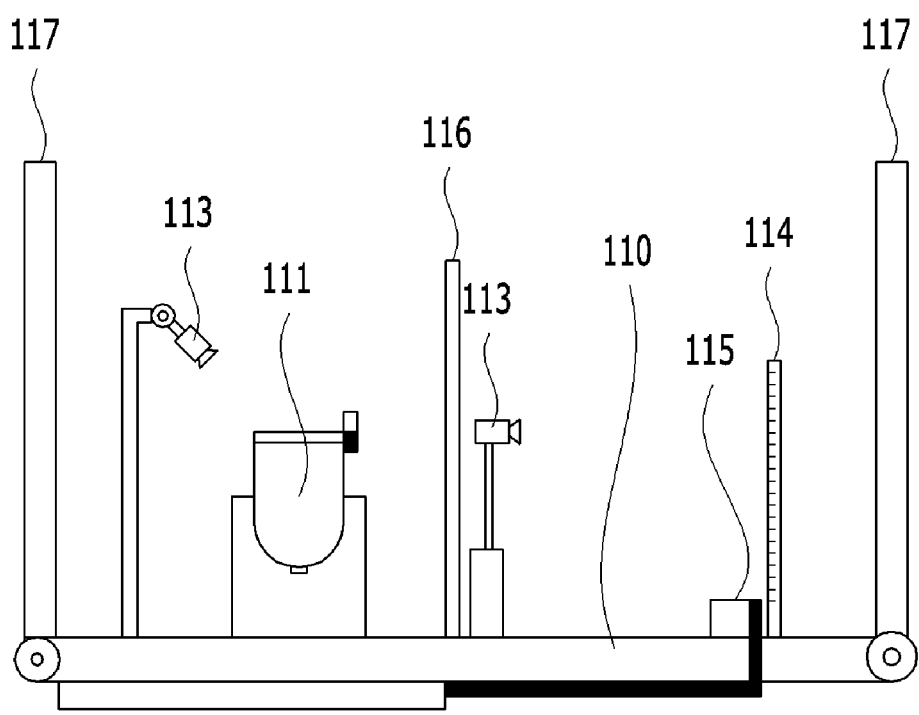
FIG. 8 is a left side view of the mobile apparatus for observing precipitation according to the embodiment of the present application.

FIG. 8 is a left side view of the mobile apparatus 100 for observing precipitation according to the embodiment of the present application.

With reference to FIG. 8, the present apparatus 100 includes at least one of the bottom plate 110, the precipitation gauge 111, the camera sensor 113, the graduated ruler 114 configured to measure deposited snow, the deposited snow removing member 115 configured to remove the completely measured deposited snow from the bottom plate 110, a blocking film 116 configured to prevent an influence between rainfall measurement and snowfall measurement, and a fence 117 configured to reduce an influence of wind at the time of measuring rainfall or snowfall. However, the present application is not limited thereto. The present apparatus 100 may have the plurality of sensors. Although not illustrated in FIG. 8, the present apparatus 100 may have the movable member 112.

The camera sensor 113 may include the precipitation gauge 111, the image-capturing camera sensor 113, the traveling camera sensor 113, the sky-view monitoring camera sensor 113, the graduated ruler 114 configured to measure deposited snow, and the image-capturing camera sensor 113 (also referred to as the deposited snow observing camera sensor 113). At least one of these components may be provided in the present apparatus 100.

The plurality of sensors includes a temperature sensor, a humidity sensor, a wet-bulb temperature sensor, an atmospheric pressure sensor, a pressure sensor, an airflow rate sensor, a wind direction sensor, a wind velocity sensor, and the like. However, the present application is not limited thereto.

The bottom plate 110, the blocking film 116, and the fence 117 may each include a heating wire configured to radiate preset heat by being controlled.

For example, the control unit 140 may control the heating wire in at least one of the bottom plate 110, the blocking film 116, and the fence 117 so that the heating wire in at least one of the bottom plate 110, the blocking film 116, and the fence 117 radiates preset heat for a preset time. The heating wire applies heat to snow being in contact with at least one of the bottom plate 110, the blocking film 116, and the fence 117, and the snow being in contact with at least one of the bottom plate 110, the blocking film 116, and the fence 117 is melted, which may obtain an effect of easily removing deposited snow on the bottom plate 110.

FIG. 9 is a view schematically illustrating a deposited snow removing operation of the mobile apparatus 100 for observing precipitation according to the embodiment of the present application.

Figure 9A:
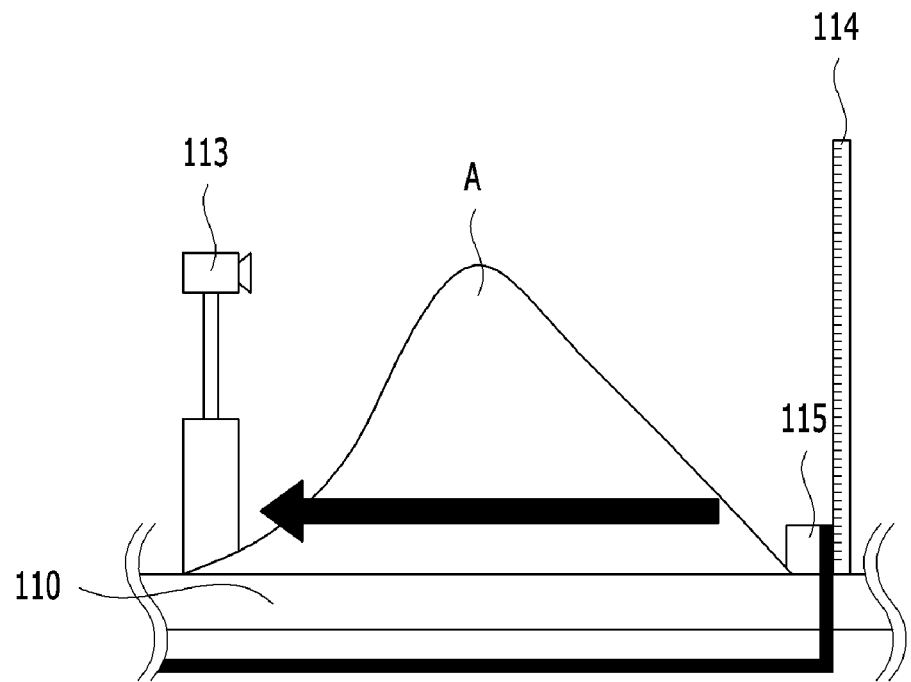
FIGS. 9A and 9B are views schematically illustrating a deposited snow removing operation of the mobile apparatus for observing precipitation according to the embodiment of the present application.
Figure 9B:
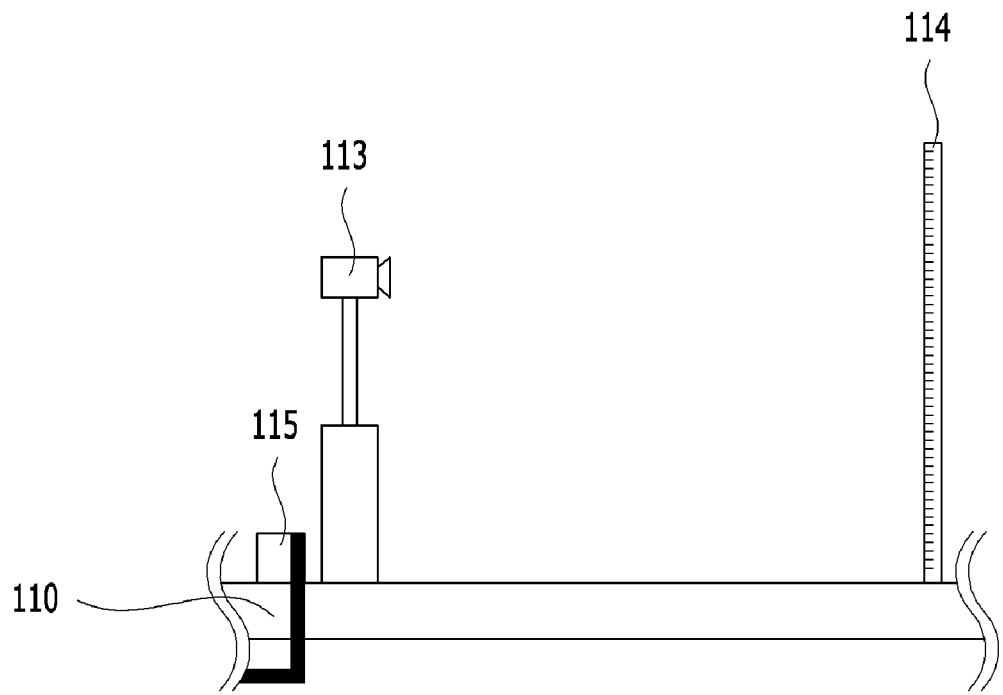

With reference to FIG. 9, the image-capturing camera sensor 113 for capturing an image of the graduated ruler 114 to measure deposited snow provided on the bottom plate 110 may capture an image of deposited snow A, which is accumulated on the bottom plate 110, and the graduated ruler 114, which is configured to measure the deposited snow A, by being controlled. The deposited snow removing member 115 may be controlled and push the deposited snow A, which is accumulated on the bottom plate 110, from one region of the bottom plate 110. With reference to FIG. 9A, a state made before the deposited snow removing member 115 removes the deposited snow A on the bottom plate 110 may be identified. With reference to FIG. 9B, a state in which the deposited snow removing member 115 pushes the deposited snow A on the bottom plate 110 from one region on the bottom plate 110 while horizontally moving from one side on the bottom plate 110 to the other side on the bottom plate 110 by being controlled may be identified.

FIG. 10 is a view illustrating an operation of changing an angle of the fence 117 of the mobile apparatus 100 for observing precipitation according to the embodiment of the present application.

Figure 10A:
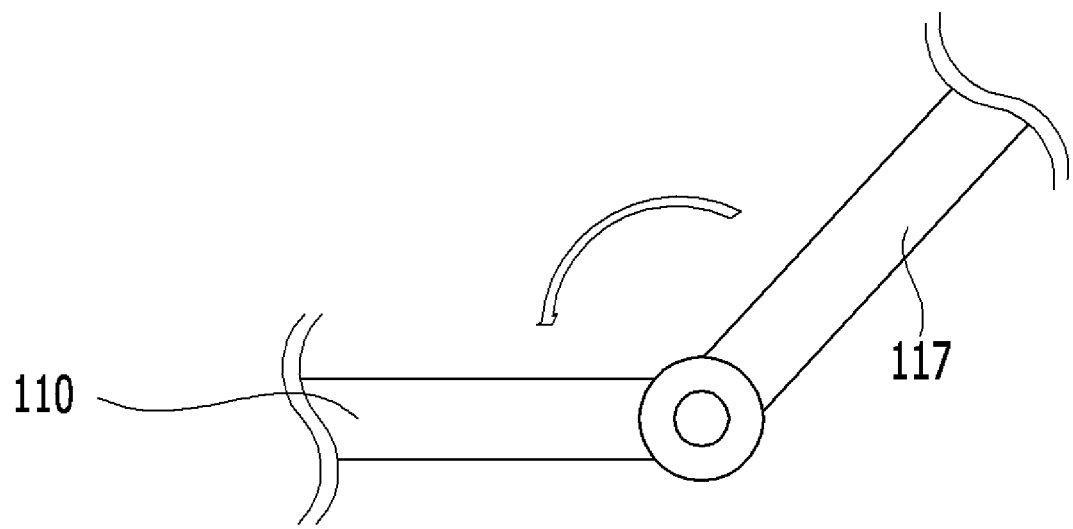
FIGS. 10A and 10B are views illustrating a fence angle changing operation of the mobile apparatus for observing precipitation according to the embodiment of the present application.
Figure 10B:
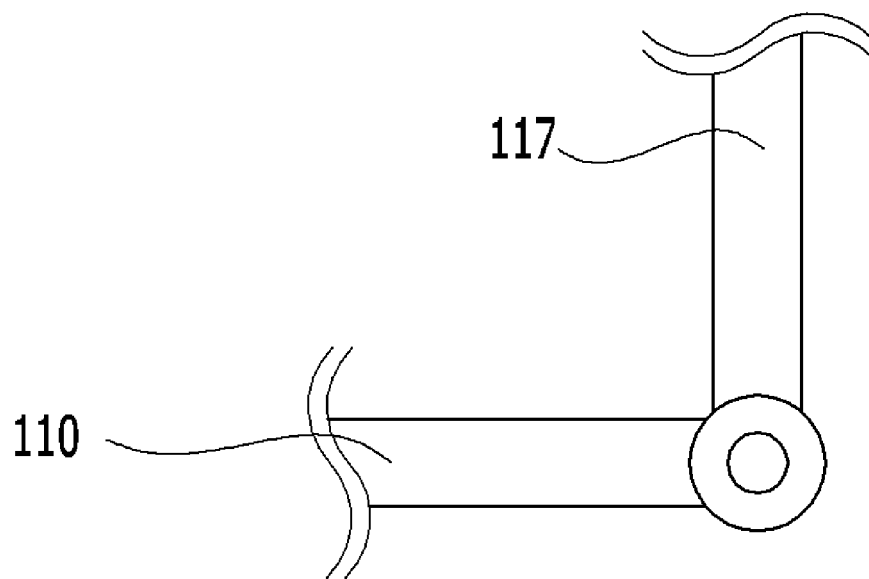

With reference to FIG. 10A, a state made before the fence 117 is controlled and operated may be identified. With reference to FIG. 10B, a state in which the fence 117 is controlled and operated, and an angle between the bottom plate 110 and the fence 117 is changed may be identified.

According to the embodiment of the present application, the bottom plate 110 may have the precipitation gauge 111 and the deposited snow observation device.

For example, at least one precipitation gauge 111 and at least one deposited snow observation device may be provided on an upper portion of the bottom plate 110, the blocking film 116 may be provided between the precipitation gauge 111 and the deposited snow observation device, and a drain port may be provided to drain the water discharged from the precipitation gauge 111 and drain the deposited snow pushed from a preset region of the deposited snow observation device.

According to the embodiment of the present application, the determination unit 150 may determine a state of precipitation.

For example, when the precipitation is detected on the basis of at least one of the image information, the sensing information, and the information received from the external server 300, the determination unit 150 may determine the state of precipitation on the basis of at least one of the image information, the sensing information, and the information received from the external server 300.

According to the embodiment of the present application, the control unit 140 may control at least one of the precipitation gauge 111 and the deposited snow observation device to measure the precipitation on the basis of the precipitation state information.

For example, when the state of precipitation is determined as rain, the control unit 140 may control the precipitation gauge 111 to measure the precipitation. On the contrary, when the state of precipitation is determined as snow, the control unit 140 may control the deposited snow observation device to measure the precipitation (deposited snow). The deposited snow observation device may include the deposited snow observing camera sensor 113, the graduated ruler 114 configured to observe deposited snow, and the deposited snow removing member 115. The process of controlling the deposited snow observation device may mean that at least one of the deposited snow observing camera sensor 113 and the deposited snow removing member 115 is controlled.

As another example, when the present apparatus 100 detects rainfall during the snowfall observation, the control unit 140 may stop the precipitation measurement by means of the deposited snow observation device and start the precipitation measurement by means of the precipitation gauge 111. In addition, when the present apparatus 100 detects snowfall during the rainfall observation, the control unit 140 may stop the precipitation measurement by means of the precipitation gauge 111 and start the precipitation measurement by means of the deposited snow observation device.

According to the embodiment of the present application, the calculation unit 160 may calculate at least one of the rainfall amount, the deposited snow amount, and the precipitation amount on the basis of precipitation measurement information.

For example, the calculation unit 160 may calculate at least one of the rainfall amount, the deposited snow amount, and the precipitation amount related to the state of precipitation and a preset time zone on the basis of the precipitation measurement information, provide at least one of the rainfall amount, the deposited snow amount, and the precipitation amount to an interface provided on the user terminal 200, and provide a time point of precipitation occurrence, a duration time point of precipitation, and a section for each shape of precipitation.

According to the embodiment of the present application, the determination unit 150 may determine whether the state of precipitation is snow or rain.

For example, the determination unit 150 may determine whether the state of precipitation is snow (snowfall) or rain (rainfall) on the basis of at least one of the image information, the sensing information, and the information received from the external server 300.

As another example, when the precipitation is detected, the determination unit 150 may input the image information and the sensing information to an artificial neural network that has learned image information related to snow, sensing information related to snow, image information related to rain, and sensing information related to rain as learning data, output the state of precipitation, and determine whether the outputted state of precipitation is snow or rain.

For example, an artificial intelligence-based learning model may be created through artificial intelligence-based learning such as machine learning and deep learning. However, the present disclosure is not limited thereto. Various neural network systems, which have been developed previously or will be developed in the future, may be applied.

According to the embodiment of the present application, when the state of precipitation is snow, the determination unit 150 may determine a state of snow as any one of dry snow and wet snow.

For example, when the detected state of precipitation is snow, the determination unit 150 may determine whether the state of snow is dry snow or wet snow on the basis of at least one of the image information, the sensing information, and the information received from the external server 300.

As another example, when the detected state of precipitation is snow, the determination unit 150 may input snow image information and snow sensing information to the artificial neural network that has learned image information of dry snow, sensing information of dry snow, image information of wet snow, and sensing information of wet snow as learning data, output information related to the state of snow, and determine the state of snow, which is detected on the basis of information related to the outputted state of snow, as any one of dry snow and wet snow.

For example, an artificial intelligence-based learning model may be created through artificial intelligence-based learning such as machine learning and deep learning. However, the present disclosure is not limited thereto. Various neural network systems, which have been developed previously or will be developed in the future, may be applied.

As another example, when the present apparatus 100 detects the precipitation and a position altitude of the present apparatus 100 is lower than a preset threshold sea level altitude, the determination unit 150 may determine the state of precipitation as any one of dry snow, wet snow, and rain on the basis of preset reference standard deviation information of a thickness value corresponding to the position information of the present apparatus 100.

As another example, the determination unit 150 may determine the state of precipitation as any one of dry snow, wet snow, and rain by inputting the state of precipitation, atmospheric temperature information, and relative humidity information into a preset determination graph and display coordinates, on which the state of precipitation, which is a determination target on the determination graph, is positioned, and the determined precipitation state information on the interface provided on the user terminal 200.

According to the embodiment of the present application, the calculation unit 160 may calculate at least one of the snow density and the water equivalent ratio on the basis of the precipitation amount and the deposited snow amount.

For example, the calculation unit 160 may calculate at least one of the snow density in the preset time zone and the water equivalent ratio in the preset time zone by computing the precipitation amount in the preset time zone and the deposited snow amount in the preset time zone by using a preset formula.

As another example, the calculation unit 160 may provide the interface provided on the user terminal 200 with the precipitation amount and the deposited snow amount as primary calculation outputs, provide the snow density and the water equivalent ratio as secondary calculation outputs corresponding to the primary calculation outputs, and provide causality between the primary calculation outputs and the secondary calculation outputs.

According to the embodiment of the present application, the determination unit 150 may determine the state of snow as any one of dry snow and wet snow on the basis of the snow density and the water equivalent ratio.

For example, when the snow density in the preset time zone is equal to or higher than a preset threshold snow density, the determination unit 150 may determine the state of snow, which corresponds to the snow density in the preset time zone, as wet snow. In addition, when the water equivalent ratio in the preset time zone is equal to or higher than a preset threshold water equivalent ratio, the determination unit 150 determines the state of snow, which corresponds to the water equivalent ratio in the preset time zone, as dry snow, i.e., dry snow that is heavy snow with a deposited snow amount per unit time equal to or higher than the preset deposited snow amount per unit time.

According to the embodiment of the present application, the calculation unit 160 may calculate predicted deposited snow amount information on the basis of the water equivalent ratio.

For example, the calculation unit 160 may calculate a predicted precipitation amount by inputting a ground atmospheric temperature and an atmospheric temperature at a particular atmospheric pressure altitude at a location within a preset radius based on the position information of the present apparatus 100 into the artificial neural network that has learned the atmospheric temperature at the particular atmospheric pressure altitude, the ground temperature, and the actual precipitation amount as learning data, and the calculation unit 160 may calculate predicted deposited snow amount information by computing the calculated predicted precipitation amount and the calculated water equivalent ratio by using a preset formula.

For example, an artificial intelligence-based learning model may be created through artificial intelligence-based learning such as machine learning and deep learning. However, the present disclosure is not limited thereto. Various neural network systems, which have been developed previously or will be developed in the future, may be applied.

According to the embodiment of the present application, the calculation unit 160 may calculate error information on the basis of the predicted deposited snow amount information and the deposited snow amount.

For example, the calculation unit 160 may input the calculated predicted deposited snow amount information into a first error artificial neural network that has learned the predicted deposited snow amount information, the actual deposited snow amount information corresponding to the predicted deposited snow amount information, and error information as a learning data set, output the predicted actual deposited snow amount information and the error information, and provide the error information to the interface provided on the user terminal 200. In addition, the calculation unit 160 may allow a second error artificial neural network to learn the predicted actual deposited snow amount information, the outputted error information, and the actual deposited snow amount information as a learning data set.

For example, an artificial intelligence-based learning model may be created through artificial intelligence-based learning such as machine learning and deep learning. However, the present disclosure is not limited thereto. Various neural network systems, which have been developed previously or will be developed in the future, may be applied.

According to the embodiment of the present application, the calculation unit 160 may apply the error information to calculate the predicted deposited snow amount information.

For example, the calculation unit 160 may calculate final predicted deposited snow amount information by inputting the predicted deposited snow amount information and the error information, which is outputted by inputting the predicted deposited snow amount information into the first error artificial neural network, into the second error artificial neural network.

According to the embodiment of the present application, when the wet-bulb temperature is equal to or higher than the preset threshold wet-bulb temperature, the control unit 140 may measure the precipitation by using the precipitation gauge 111.

For example, when the present apparatus 100 determines that snowfall has occurred or snowfall will occur within the preset time during the rainfall observation and the control unit 140 ends the rainfall observation, the observation time determination unit 130 stops the remaining rainfall observation time. Thereafter, when a wet-bulb temperature at the periphery of the present apparatus 100 is equal to or higher than the threshold wet-bulb temperature and rainfall is detected, the observation time determination unit 130 may restart the rainfall observation with the remaining rainfall observation time at the time point at which the remaining rainfall observation time has been stopped.

According to the embodiment of the present application, when the wet-bulb temperature is lower than the threshold wet-bulb temperature, the control unit 140 may measure the precipitation by using a deposited snow amount measurement device.

For example, when the present apparatus 100 determines that rainfall has occurred or rainfall will occur within the preset time during the snowfall observation and the control unit 140 ends the snowfall observation, the observation time determination unit 130 stops the remaining snowfall observation time. Thereafter, when a wet-bulb temperature at the periphery of the present apparatus 100 is lower than the threshold wet-bulb temperature and snowfall is detected, the observation time determination unit 130 may restart the snowfall observation with the remaining snowfall observation time at the time point at which the remaining snowfall observation time has been stopped. The deposited snow observation device may include the deposited snow observing camera sensor 113, the graduated ruler 114 configured to observe deposited snow, and the deposited snow removing member 115. The process of using the deposited snow observation device may mean that at least one of the deposited snow observing camera sensor 113 and the deposited snow removing member 115 is used.

According to the embodiment of the present application, the plurality of precipitation gauges 111 may each include the lid 111b and the drain port 111c that are opened or closed by being controlled.

For example, the plurality of precipitation gauges 111 may each include the precipitation detection sensor 111a. When the precipitation detection sensor 111a detects precipitation, the control unit 140 may perform control to open the precipitation gauge 111 by horizontally rotating the lid 111b about the shaft on which the precipitation detection sensor 111a is provided. The control unit 140 may horizontally rotate the lid 111b in a preset direction and at a preset speed to open the precipitation gauge 111. In addition, when the precipitation observation time determined by the observation time determination unit 130 elapses after the precipitation gauge 111 is opened, the control unit 140 may perform control to close the precipitation gauge 111 by horizontally rotating the lid 111b about the shaft on which the precipitation detection sensor 111a is provided. The control unit 140 may horizontally rotate the lid 111b in a preset direction and at a preset speed to close the precipitation gauge 111. In addition, when the precipitation observation is ended even though the precipitation observation time determined by the observation time determination unit 130 remains after the precipitation gauge 111 is opened, the control unit 140 may perform control to close the precipitation gauge 111 by horizontally rotating the lid 111b about the shaft on which the precipitation detection sensor 111a is provided.

In addition, the present apparatus 100 may obtain the precipitation amount by measuring water in the precipitation gauge 111.

In addition, after the present apparatus 100 obtains the precipitation amount, the control unit 140 may drain the water in the precipitation gauge 111 by a preset drain amount per unit time by controlling the drain port 111c.

In addition, at least one drain port 111c may be provided on the precipitation gauge 111. In addition, the drain port 111c may be opened or closed by being controlled by the control unit 140, and a diameter of the drain port 111c, which is opened or closed, may also be adjusted.

In addition, the precipitation gauge 111 may have a member that increases pressure in the precipitation gauge 111 by being controlled by the control unit 140.

According to the embodiment of the present application, the lid 111b may be provided on the upper portion of the precipitation gauge 111.

For example, the lid 111b provided on the upper portion of the precipitation gauge 111 is horizontally rotated by being controlled by the control unit 140 in a preset direction and at a preset speed about the shaft on which the precipitation detection sensor 111a is positioned. When an error degree between direction information and speed information included in a control instruction and actual direction information and actual speed information of an actual horizontal rotation of the lid 111b is equal to or higher than a preset degree, the control unit 140 may end the observation, the movement unit 120 may control the movable member 112 to move the present apparatus 100 from the second position to the first position, the present apparatus 100 may transmit a repair requirement notification related to the lid 111b to the user terminal 200, and the present apparatus 100 may transfer repair request information to a repairer terminal. The repair request information may include presumed abnormal part information of the lid 111b, a request deadline, and the like.

According to the embodiment of the present application, the drain port 111c may be provided on a lower portion of the precipitation gauge 111.

For example, the drain port 111c provided on the lower portion of the precipitation gauge 111 drains the water in the precipitation gauge 111 by a preset drain amount per unit time under the control of the control unit 140. When an error degree between drain amount per unit time information included in a control instruction and actual drain amount per unit time information of the drain port 111c is equal to or higher than a preset degree, the control unit 140 may end the drain process, the movement unit 120 may control the movable member 112 to move the present apparatus 100 from the second position to the first position, the present apparatus 100 may transmit a repair requirement notification related to the drain port 111c to the user terminal 200, and the present apparatus 100 may transfer repair request information to the repairer terminal. The repair request information may include presumed abnormal part information of the drain port 111c, a request deadline, and the like.

According to the embodiment of the present application, the control unit 140 may open the lid 111b for the preset precipitation observation time.

For example, the control unit 140 may perform control for the precipitation observation time in the state in which the lid 111b provided on the upper portion of the precipitation gauge 111 is opened and the drain port 111c is closed.

As another example, the control unit 140 may perform control for the precipitation observation time in the state in which the lid 111b of the precipitation gauge 111 is opened and the drain port 111c is opened so that the water accommodated in the precipitation gauge 111 is drained within a preset time. When the water comes into contact with the precipitation gauge 111, the present apparatus 100 may obtain the precipitation amount per unit time in consideration of intensity of the precipitation amount per unit time and a weight of the water sensed at the moment of the contact, and the present apparatus 100 may calculate the precipitation amount in consideration of the precipitation amount per unit time and the precipitation observation time.

According to the embodiment of the present application, the control unit 140 may close the lid 111b when the precipitation observation time has elapsed.

For example, when the lid 111b provided on the upper portion of the precipitation gauge 111 is closed, the present apparatus 100 may obtain the precipitation amount by measuring the water in the precipitation gauge 111, and then the control unit 140 may perform control to open the drain port 111c.

As another example, when rainfall and snowfall are not detected after the precipitation observation time elapses and the precipitation amount is measured, the control unit 140 may perform control to maintain the state in which the lid 111b and the drain port 111c are opened until humidity in the precipitation gauge 111 becomes lower than a preset degree. In a climate where rainfall and snowfall do not occur, when the present apparatus 100 does not observe the precipitation, the present apparatus 100 opens the lid 111b and the drain port 111c of the precipitation gauge 111 to increase an evaporation rate in the precipitation gauge 111, thereby increasing accuracy of a precipitation amount measurement value at the time of measuring the precipitation amount later by using the precipitation gauge 111.

According to the embodiment of the present application, when a water level in the first precipitation gauge 111 exceeds a preset threshold water level before the precipitation observation time is ended, the control unit 140 may perform control to close the lid 111b of the first precipitation gauge 111 and open the lid 111b of the second precipitation gauge 111.

For example, the first precipitation gauge 111 may include at least one precipitation gauge 111, and the second precipitation gauge 111 may include at least one precipitation gauge 111 that is not the first precipitation gauge 111. The control unit 140 may set the plurality of precipitation gauges 111, which is symmetric with respect to the bottom plate 110, as the first precipitation gauge 111 and the second precipitation gauge 111. As the control unit 140 sets the plurality of precipitation gauges 111, which is symmetric with respect to the bottom plate 110, as the first precipitation gauge 111 and the second precipitation gauge 111, it is possible to obtain an effect of stably operating the present apparatus 100 by the movement unit 120 that operates while accommodating the water.

As another example, on the basis of at least one of the speeds and the time points at which the lid 111b of the first precipitation gauge 111 is opened and closed, the control unit 140 may set the speeds and the time points at which the drain port 111c of the first precipitation gauge 111 is opened and closed and set the speeds and the time points at which the lid 111b and the drain port 111c of the second precipitation gauge 111 are opened and closed. For example, the control unit 140 may perform setting so that the speed of opening the lid 111b of the first precipitation gauge 111 and the speed of closing the lid 111b of the second precipitation gauge 111 are equal to each other and the speed of closing the lid 111b of the first precipitation gauge 111 and the speed of opening the lid 111b of the second precipitation gauge 111 are equal to each other. In addition, when the present apparatus 100 detects the precipitation and does not end the precipitation observation, the control unit 140 may perform control to start the operation of closing the lid 111b of the first precipitation gauge 111 at a time point at which the water in the first precipitation gauge 111 exceeds the threshold water level after opening the lid 111b of the first precipitation gauge 111, and the control unit 140 may perform control to start the operation of opening the lid 111b of the second precipitation gauge 111 at a time point at which the water in the first precipitation gauge 111 exceeds the threshold water level after opening the lid 111b of the first precipitation gauge 111. In addition, when the present apparatus 100 detects the precipitation and does not end the precipitation observation, the control unit 140 may perform control to start the operation of closing the lid 111b of the second precipitation gauge 111 at a time point at which the water in the second precipitation gauge 111 exceeds the threshold water level after opening the lid 111b of the second precipitation gauge 111, and the control unit 140 may perform control to start the operation of opening the lid 111b of the first precipitation gauge 111 at a time point at which the water in the second precipitation gauge 111 exceeds the threshold water level after opening the lid 111b of the second precipitation gauge 111.

According to the embodiment of the present application, when the lid 111b of the precipitation gauge 111 is closed or the observation is ended, the control unit 140 may sense the water in the precipitation gauge 111 and then open the drain port 111c to discharge the water.

For example, the control unit 140 may perform control to start the operation of opening the drain port 111c of the first precipitation gauge 111 after sensing the water in the first precipitation gauge 111 after closing the lid 111b of the first precipitation gauge 111, and the control unit 140 may set the drain amount per unit time of the first precipitation gauge 111 so that a decrease rate of the water in the first precipitation gauge 111 is higher than an increase rate of the water in the second precipitation gauge 111. In addition, the control unit 140 may perform control to start the operation of opening the drain port 111c of the second precipitation gauge 111 after sensing the water in the second precipitation gauge 111 after closing the lid 111b of the second precipitation gauge 111, and the control unit 140 may set the drain amount per unit time of the second precipitation gauge 111 so that a decrease rate of the water in the second precipitation gauge 111 is higher than an increase rate of the water in the first precipitation gauge 111. In order to increase the drain amount per unit time, the control unit 140 may selectively control the plurality of drain ports 111c provided on the precipitation gauge 111, increase an opening diameter of the drain port 111c, or increase the pressure in the precipitation gauge 111.

According to the embodiment of the present application, the apparatus for observing precipitation may include the plurality of fences 117 extending from the bottom plate 110, and an angle of the fence with respect to the bottom plate 110 may be controlled and changed.

According to the embodiment of the present application, the control unit 140 may control the fence 117 for the deposited snow measurement time so that the angle between the bottom plate 110 and the fence 117 is a preset angle.

According to the embodiment of the present application, when foreign substances are detected in the precipitation gauge 111 with the opened lid 111b, the control unit 140 may control the air blower 111d (air-blow) provided in the precipitation gauge 111 to discharge the foreign substances.

For example, a plurality of sensors may be provided in the precipitation gauge 111. When the present apparatus 100 detects foreign substances in the precipitation gauge 111 with the opened lid 111b on the basis of sensing information, the control unit 140 may selectively control the air blower 111d, which has the spray port that is not submerged in the water among the plurality of air blowers 111d provided in the precipitation gauge 111, to spray air with preset spray intensity on the basis of at least one of the image information and the sensing information until the foreign substances are discharged to the outside of the precipitation gauge 111. In addition, when the present apparatus 100 detects the introduction of foreign substances into the precipitation gauge 111 on the basis of the image information created by the camera sensor 113 configured to capture an image of the precipitation gauge 111, the control unit 140 may selectively control the air blower 111d, which has the spray port that is not submerged in the water among the plurality of air blowers 111d provided in the precipitation gauge 111, to spray air with preset spray intensity on the basis of at least one of the image information and the sensing information until the foreign substances are discharged to the outside of the precipitation gauge 111.

As another example, when rainfall and snowfall are not detected after the precipitation observation time elapses after the precipitation amount is measured, the control unit 140 may perform control to maintain the state in which the lid 111b and the drain port 111c are opened on the basis of the sensing information in the precipitation gauge 111 until humidity in the precipitation gauge 111 becomes lower than a preset degree, and the control unit 140 may perform control so that the air blower 111d provided in the precipitation gauge 111 sprays air with preset spray intensity on the basis of the sensing information in the precipitation gauge 111 until humidity in the precipitation gauge 111 becomes lower than the preset degree. In a climate where rainfall and snowfall do not occur, when the present apparatus 100 does not observe the precipitation, the present apparatus 100 opens the lid 111b and the drain port 111c of the precipitation gauge 111 to increase an evaporation rate in the precipitation gauge 111 by operating the air blower 111d, thereby increasing accuracy of a precipitation amount measurement value at the time of measuring the precipitation amount later by using the precipitation gauge 111.

According to the embodiment of the present application, when a temperature in the precipitation gauge 111 is lower than a preset threshold temperature, the control unit 140 may control a heater provided in the precipitation gauge 111 and increase the temperature in the precipitation gauge 111 to a temperature equal to or higher than a threshold temperature.

For example, when a temperature in the precipitation gauge 111 is lower than the preset threshold temperature on the basis of the sensing information, the control unit 140 may control the heater provided in the precipitation gauge 111 to apply heat with preset intensity to the precipitation gauge 111 on the basis of the sensing information until the temperature in the precipitation gauge 111 becomes a temperature equal to or higher than the threshold temperature.

As another example, when rainfall and snowfall are not detected after the precipitation observation time elapses after the precipitation amount is measured, the control unit 140 may perform control to maintain the state in which the lid 111b and the drain port 111c are opened on the basis of the sensing information in the precipitation gauge 111 until humidity in the precipitation gauge 111 becomes lower than a preset degree, and the control unit 140 may perform control so that the air blower 111d provided in the precipitation gauge 111 sprays air with preset spray intensity on the basis of the sensing information in the precipitation gauge 111 until humidity in the precipitation gauge 111 becomes lower than the preset degree. The control unit 140 may perform control so that the heater provided in the precipitation gauge 111 applies heat with preset intensity to the precipitation gauge 111 on the basis of the sensing information in the precipitation gauge 111 until humidity of the precipitation gauge 111 becomes lower than the preset degree. In a climate where rainfall and snowfall do not occur, when the present apparatus 100 does not observe the precipitation, the present apparatus 100 opens the lid 111b and the drain port 111c of the precipitation gauge 111 to increase an evaporation rate in the precipitation gauge 111 by operating the air blower 111d and the heater, thereby increasing accuracy of a precipitation amount measurement value at the time of measuring the precipitation amount later by using the precipitation gauge 111.

Hereinafter, an operation flow of the present application will be briefly described with reference to the contents described above in detail.

Figure 11:
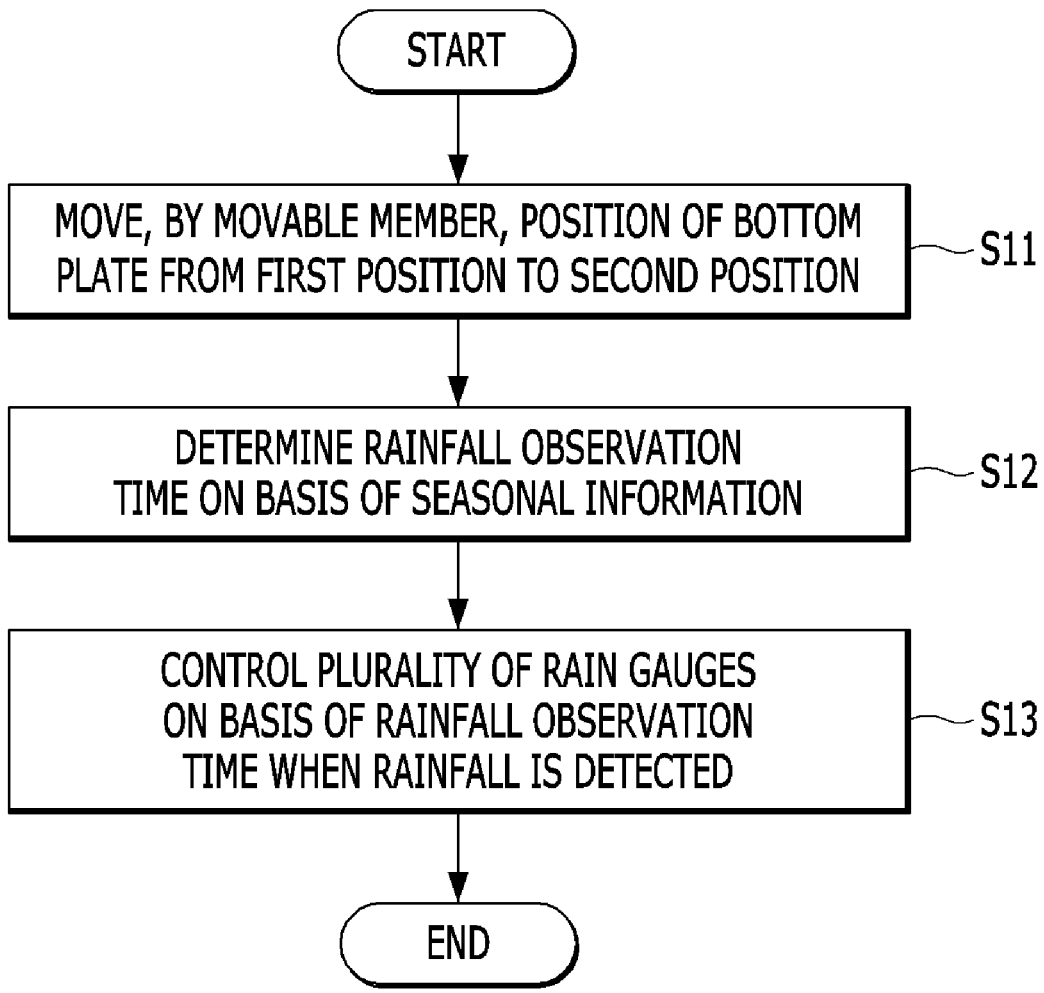
FIG. 11 is an operational flowchart of a method of controlling the mobile apparatus for observing precipitation according to the embodiment of the present application.

FIG. 11 is an operational flowchart of a method of controlling the mobile apparatus 100 for observing precipitation according to the embodiment of the present application.

Figure 12:
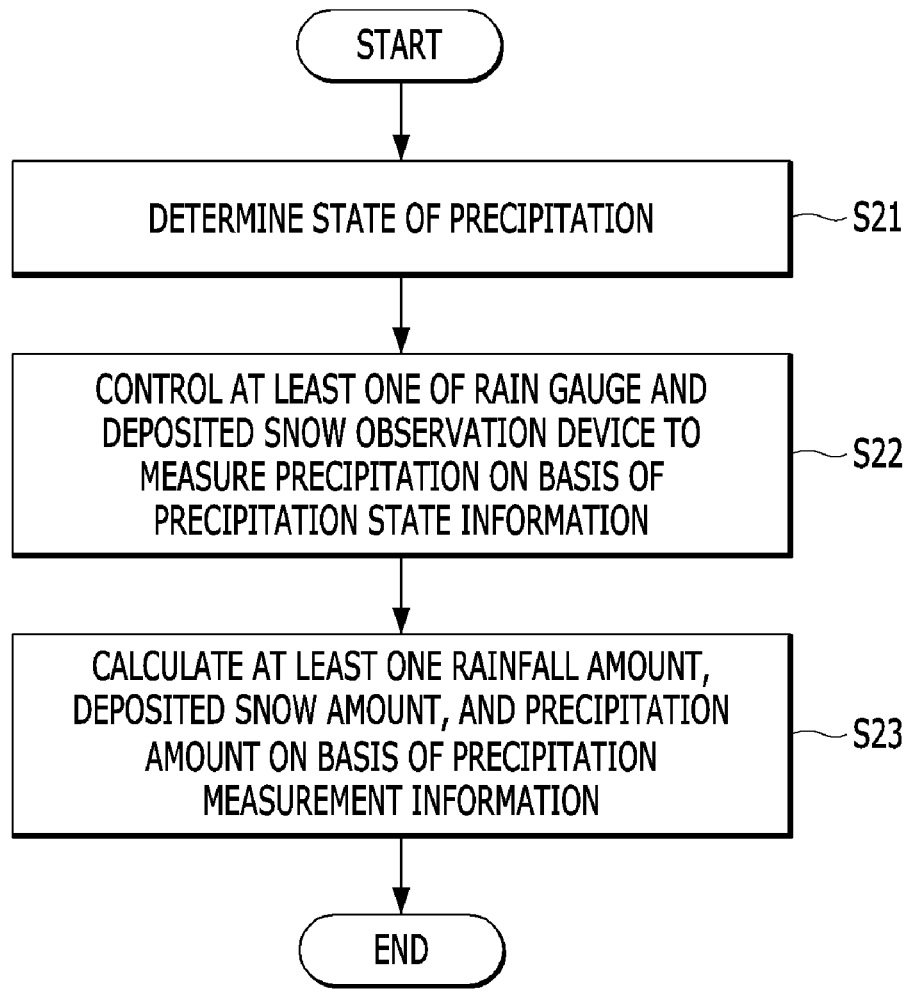
FIG. 12 is an operational flowchart of the method of controlling the mobile apparatus for observing precipitation according to the embodiment of the present application.

FIG. 12 is an operational flowchart of the method of controlling the mobile apparatus 100 for observing precipitation according to the embodiment of the present application.

The method of controlling the mobile apparatus 100 for observing precipitation (hereinafter, also referred to as 'the present method') illustrated in FIGS. 11 and 12 may be performed by the above-mentioned mobile apparatus 100 for observing precipitation. Therefore, the contents described regarding the mobile apparatus 100 for observing precipitation may be equally applied to the description of the method of controlling the mobile apparatus 100 for observing precipitation even though the contents are omitted.

With reference to FIG. 11, the present method may include steps S11 to S13.

In step S11, the movement unit 120 may use the movable members 112 and move the position of the bottom plate 110 from the first position to the second position.

Next, in step S12, the observation time determination unit 130 may determine the precipitation observation time on the basis of the seasonal information.

Next, in step S13, when the precipitation is detected, the control unit 140 may control the plurality of precipitation gauges 111 on the basis of the precipitation observation time.

With reference to FIG. 12, the present method may include steps S21 to S23.

In step S21, the determination unit 150 may determine the state of precipitation.

Next, in step S22, the control unit 140 may control at least one of the precipitation gauge 111 and the deposited snow observation device to measure the precipitation on the basis of the precipitation state information.

Next, in step S23, the calculation unit 160 may calculate at least one of the rainfall amount, the deposited snow amount, and the precipitation amount on the basis of the precipitation measurement information.

In the above-mentioned description, steps S11 to S13 and steps S21 to S23 may be divided into additional steps or combined into fewer steps according to the embodiment of the present application. In addition, some steps may be eliminated as necessary. The order of the steps may be changed.

The method of controlling the mobile apparatus 100 for observing precipitation according to the embodiment of the present application may be implemented in the form of program commands executable by means of various computer means and then written in a computer-readable recording medium. The computer-readable medium may include program instructions, data files, data structures, or the like, in a stand-alone form or in a combination thereof. The program instructions recorded in the medium may be specially designed and configured for the present disclosure or may be known and available to those skilled in computer software. Examples of the computer-readable recording medium may include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Examples of the program instructions may include machine codes made by, for example, a compiler, as well as high-language codes that may be executed by an electronic data processing device, for example, a computer, by using an interpreter. The above-mentioned hardware devices may be configured to operate as one or more software modules in order to perform the operation of the present disclosure, and the opposite is also possible.

In addition, the method of controlling the mobile apparatus 100 for observing precipitation may also be implemented in the form of a computer program or application stored in a recording medium and executed by a computer.

It will be appreciated that the embodiments of the present application have been described above for purposes of illustration, and those skilled in the art may understand that the present application may be easily modified in other specific forms without changing the technical spirit or the essential features of the present application. Therefore, it should be understood that the above-described embodiments are illustrative in all aspects and do not limit the present disclosure. For example, each component described as a single type may be carried out in a distributed manner. Likewise, components described as a distributed type can be carried out in a combined type.

The scope of the present application is represented by the claims to be described below rather than the detailed description, and it should be interpreted that the meaning and scope of the claims and all the changes or modified forms derived from the equivalent concepts thereto fall within the scope of the present application.

What is claimed is:

1. A mobile apparatus for observing precipitation, the mobile apparatus comprising:
    a bottom plate including a plurality of precipitation gauges and a movable member;
    a movement unit configured to move a position of the bottom plate from a first position to a second position by using the movable member;
    an observation time determination unit configured to determine a precipitation observation time on the basis of seasonal information; and
    a control unit configured to control the plurality of precipitation gauges on the basis of the precipitation observation time when precipitation is detected,
    wherein the control unit ends rainfall observation when snowfall is detected during the rainfall observation.

2. The mobile apparatus of claim 1, wherein the observation time determination unit determines a preset first time as the precipitation observation time when the seasonal information indicates summer, and determines a preset second time as the precipitation observation time when the seasonal information indicates winter.

3. The mobile apparatus of claim 2, wherein the observation time determination unit decreases the precipitation observation time by a preset degree when the precipitation amount per unit time is equal to or higher than a preset degree.

4. The mobile apparatus of claim 1, wherein the control unit ends the rainfall observation when a wet-bulb temperature is lower than a preset threshold wet-bulb temperature.

5. The mobile apparatus of claim 4, wherein the control unit starts the rainfall observation when the wet-bulb temperature is equal to or higher than the threshold wet-bulb temperature.

6. The mobile apparatus of claim 1, wherein the control unit ends the rainfall observation when a water equivalent ratio is equal to or higher than a preset degree.

7. The mobile apparatus of claim 1, wherein the control unit ends the rainfall observation when snow density is lower than a preset degree.

8. The mobile apparatus of claim 1, wherein the plurality of precipitation gauges each comprise a lid and a drain port that are opened or closed by being controlled,
    wherein the lid is provided on an upper portion of the precipitation gauge,
    wherein the drain port is provided on a lower portion of the precipitation gauge, and
    wherein the control unit opens the lid for the precipitation observation time and closes the lid when the precipitation observation time has elapsed.

9. The mobile apparatus of claim 8, wherein the control unit closes a lid of a first precipitation gauge and opens a lid of a second precipitation gauge when a water level in the first precipitation gauge exceeds a preset threshold water level before the precipitation observation time ends.

10. The mobile apparatus of claim 8, wherein when the lid of the precipitation gauge is closed or observation ends, the control unit drains water by opening the drain port after sensing the water in the precipitation gauge.

11. The mobile apparatus of claim 8, wherein when foreign substances are detected in the precipitation gauge with the opened lid, the control unit discharges the foreign substances to the outside by controlling an air blower provided in the precipitation gauge.

12. The mobile apparatus of claim 8, wherein when a temperature in the precipitation gauge is lower than a preset threshold temperature, the control unit increases the temperature in the precipitation gauge to a temperature equal to or higher than the threshold temperature by controlling a heater provided in the precipitation gauge.

13. A method of controlling a mobile apparatus for observing precipitation, which comprises a bottom plate including a plurality of precipitation gauges and a movable member, the method comprising:
    moving, by the movable member, a position of the bottom plate from a first position to a second position;
    determining a precipitation observation time on the basis of seasonal information; and
    controlling the plurality of precipitation gauges on the basis of the precipitation observation time when precipitation is detected,
    wherein the controlling of the plurality of precipitation gauges includes ending rainfall observation when snowfall is detected during the rainfall observation.

14. A computer-readable recording medium configured to store a program for performing the method of controlling a mobile apparatus for observing precipitation according to claim 13 in a computer.

* * * * *